United States Patent
Kurokawa et al.

(10) Patent No.: US 8,994,212 B2
(45) Date of Patent: Mar. 31, 2015

(54) ELECTRIC POWER SUPPLY APPARATUS

(71) Applicant: Honda Motor Co., Ltd, Tokyo (JP)

(72) Inventors: Manabu Kurokawa, Sakura (JP);
Toshihiro Sone, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 171 days.

(21) Appl. No.: 13/898,642

(22) Filed: May 21, 2013

(65) Prior Publication Data
US 2013/0342151 A1    Dec. 26, 2013

(30) Foreign Application Priority Data
Jun. 20, 2012    (JP) ................................ 2012-139064

(51) Int. Cl.
*H02J 1/10*    (2006.01)
*H02M 7/537*    (2006.01)
*H02M 3/158*    (2006.01)
*H02J 7/00*    (2006.01)

(52) U.S. Cl.
CPC .............. *H02M 7/537* (2013.01); *H02M 3/158* (2013.01); *H02J 7/0024* (2013.01); *Y02T 10/7055* (2013.01)
USPC ................. 307/63; 307/37; 307/71; 320/117; 320/126; 318/95; 318/497; 318/526

(58) Field of Classification Search
USPC .......... 318/83, 93, 95, 111, 112, 400.01, 497; 318/526; 320/117, 126; 323/271, 272, 346; 307/37, 63, 71
See application file for complete search history.

(56) References Cited

U.S. PATENT DOCUMENTS

| | | | |
|---|---|---|---|
| 7,710,067 B2 * | 5/2010 | Kosaka et al. | ................ 318/812 |
| 2008/0054870 A1 * | 3/2008 | Kosaka et al. | ................ 323/293 |

FOREIGN PATENT DOCUMENTS

| | | |
|---|---|---|
| DE | 102008053609 A1 | 4/2010 |
| JP | 2008-67432 A | 3/2008 |
| JP | 2008-206299 A | 9/2008 |
| JP | 2010-178421 A | 8/2010 |
| JP | 2012-060838 A | 3/2012 |
| JP | 2012-70514 A | 4/2012 |
| JP | 2012-152079 A | 8/2012 |
| WO | 2011/092774 A1 | 8/2011 |

(Continued)

OTHER PUBLICATIONS

German Search Report dated Feb. 3, 2014, issued in corresponding German Patent Application No. 102013211140.1 with English Translation. (10 pages).

(Continued)

*Primary Examiner* — Antony M Paul
(74) *Attorney, Agent, or Firm* — Westerman, Hattori, Daniels & Adrian, LLP

(57) ABSTRACT

A control device of an electric power supply apparatus controls a voltage applied to an inverter to fall within a voltage range between a first voltage that is the voltage of one of a first electric power supply and a second electric power supply and a second voltage that is the sum of the voltage of the first electric power supply and the voltage of the second electric power supply, by alternately switching between a series state in which a current loop that connects the first electric power supply, the second electric power supply, and a reactor in series with the inverter is formed, and a parallel state in which the first electric power supply and the second electric power supply are connected in parallel with the inverter as an electric load.

15 Claims, 22 Drawing Sheets

(56) References Cited

FOREIGN PATENT DOCUMENTS

| WO | 2012/006746 A1 | 1/2012 |
| WO | 2012/053027 A1 | 4/2012 |

OTHER PUBLICATIONS

Japanese Office Action dated Mar. 18, 2014, issued in corresponding Japanese Patent Application No. 2012-139064 with English translation (10 pages).

* cited by examiner

|  | COMPARISON EXAMPLE | EXAMPLE (VB1 = VB2) | FIRST MODIFIED EXAMPLE (VB1 = VB2) |
|---|---|---|---|
| VOLTAGE BOOST RATE | 1/(1−D) | (D2+1) | 2/(2−D2) |
| TOTAL INTERLINKAGE MAGNETIC FLUX | V1 × D | (2 × VB1−Vout) × D2 | (2 × VB1−Vout) × D2 |

ELECTRIC POWER SUPPLY APPARATUS

Priority is claimed on Japanese Patent Application No. 2012-139064, filed on Jun. 20, 2012, the contents of which are incorporated herein by reference.

BACKGROUND OF THE INVENTION

1. Field of the Invention

The present invention relates to an electric power supply apparatus.

2. Description of Related Art

In the related art, for example, an electric power supply apparatus is known that includes four relays (a first to fourth relay), two rechargeable batteries, and a boost converter, and that connects the two rechargeable batteries to an electric load switching between a series connection state and a parallel connection state, while adjusting a voltage applied to the electric load by the boost converter (for example, refer to Japanese Unexamined Patent Application Publication No. 2012-060838).

In addition, in the related art, for example, an electric power supply system is known that includes four switching devices (a first to fourth switching device), two reactors, and two direct current (DC) power supplies, and that connects the two DC power supplies to an electric load switching between a series connection state and a parallel connection state, while adjusting a voltage applied to the electric load (for example, refer to Japanese Unexamined Patent Application Publication No. 2012-070514).

SUMMARY OF THE INVENTION

In the electric power supply apparatus according to the above related art, the number of components required to configure the apparatus increases, attributed to having the four relays (the first to fourth relay) and the boost converter, which leads to such problems as the apparatus becomes larger and a cost required for a configuration increases.

Meanwhile, in the electric power supply system according to the above related art, two switching devices are included in each of electrical conduction paths for the series connection state and the parallel connection state, which leads to such a problem as the electrical conduction loss increases.

Moreover, in the electric power supply system according to the above related art, since a total interlinkage magnetic flux of the reactor changes to an increasing tendency corresponding to an increase of a voltage boost rate, the loss increases and a requirement to enlarge the reactor arises.

In view of the foregoing, an object of aspects of the present invention is to provide an electric power supply apparatus capable of suitably switching a connection state of a plurality of electric power supplies, while preventing the apparatus from becoming larger and the cost required for a configuration from increasing.

In order to achieve the above object, an electric power supply apparatus according to aspects of the present invention adopts one of the configurations described below.

(1) An aspect of the present invention is an electric power supply apparatus includes: a first electric power supply that is connected between a first node and a second node; a second electric power supply that is connected between a third node and a fourth node; a switch circuit having at least four input terminals, each of which is connected to the first node, the second node, the third node, and the fourth node, and having at least two output terminals; an electric load that is connected between the two output terminals; a reactor that is provided at least any one of between the first electric power supply and one of the first node and the second node, and between the second electric power supply and one of the third node and the fourth node; and a voltage control section that alternately switches between: (A) a series state in which a voltage between both ends of the reactor is increased by connecting the first node with the fourth node, connecting the second node with the a first output terminal, and connecting the third node with a second output terminal, to form a current loop that connects the first electric power supply, the second electric power supply, and the reactor in series with the electric load, and (B) a parallel state in which the voltage between both ends of the reactor is decreased by connecting the first node and the third node with the second output terminal, and connecting the second node and the fourth node with the first output terminal, to connect the first electric power supply and the second electric power supply in parallel with the electric load, and that performs, by the alternate switching, a voltage adjustment control which controls a voltage applied to the electric load to fall within a voltage range between a first voltage that is the voltage, of the first electric power supply or the voltage of the second electric power supply and a second voltage that is the sum of the voltage of the first electric power supply and the voltage of the second electric power supply.

(2) In the aspect of (1) described above, the switch circuit may include a first switch that is connected between the first node and the third node, a second switch that is connected between the first node and the fourth node, and a third switch that is connected between the second node and the fourth node, wherein the voltage control section may alternately switch between the series state and the parallel state, by alternately switching between a first state in which a pair of the first switch and the third switch is closed and the second switch is open, and a second state in which a pair of the first switch and the third switch is open and the second switch is closed.

(3) In the aspect of (1) or (2) described above, the electric power supply apparatus may include an electric motor as the electric load, wherein the voltage control section may include, as an operation mode, a parallel mode that sets the first switch and the third switch to be closed and the second switch to be open, to connect the first electric power supply and the second electric power supply in parallel with the electric motor.

(4) In the aspect of (1) or (2) described above, the electric power supply apparatus may include an electric motor as the electric load, wherein the voltage control section may include, as an operation mode, a series mode that sets the first switch and the third switch to be open and the second switch to be closed, to connect the first electric power supply and the second electric power supply in series with the electric motor.

(5) In the aspect of (1) or (2) described above, the electric power supply apparatus may include an electric motor as the electric load, wherein the voltage control section may include, as operation modes, a parallel mode that sets the first switch and the third switch to be closed and the second switch to be open, to connect the first electric power supply and the second electric power supply in parallel with the electric motor, and a series mode that sets the first switch and the third switch to be open and the second switch to be closed, to connect the first electric power supply and the second electric power supply in series with the electric motor, and may perform the voltage adjustment control when switching between the parallel mode and the series mode.

(6) In the aspect of any one of (1) to (5) described above, the reactor may be provided between the first electric power supply and one of the first node and the second node.

(7) In the aspect of (6) described above, the electric power supply apparatus may include, as the reactor, a second reactor that is provided between the second electric power supply and one of the third node and the fourth node.

(8) In the aspect of (7) described above, a plurality of the reactors may be magnetically coupled.

(9) In the aspect of any one of (1) to (8) described above, the electric power supply apparatus may include a reactor that is provided between the electric load and any one of the two output terminals.

(10) In the aspect of (1) or (2) described above, the electric power supply apparatus may include an electric motor as the electric load, wherein the voltage control section may include, as operation modes, a parallel mode that sets the first switch and the third switch to be closed and the second switch to be open, to connect the first electric power supply and the second electric power supply in parallel with the electric motor, a first constant current mode that makes the first switch closed, the third switch open, and the second switch open, prior to performing the parallel mode, and a second constant current mode that makes the first switch open, the third switch closed, and the second switch open, prior to performing the parallel mode.

According to the aspect of (1) described above, a current loop that connects the first electric power supply, the second electric power supply, and the reactor in series with the electric load is formed, to increase the voltage of both ends of the reactor in the series state that is alternately switched with the parallel state.

Thereby, for example, in comparison with a case where a current loop that connects each of the electric power supplies in series only with the reactor is formed, it is possible to suppress an increase of a total interlinkage magnetic flux associated with an increase of a voltage boost rate, to prevent an increase of loss, and to downsize the reactor.

According to the aspect of (2) described above, the switch circuit is configured to include three switches of the first switch to the third switch. Thereby, for example, in comparison with a case where the switch circuit includes four or more switches, it is possible to prevent the apparatus from becoming larger, and to prevent the cost required for a configuration from increasing.

Moreover, only any one of the first switch to the third switch is included in each of electrical conduction paths for the series state and the parallel state. Thereby, for example, in comparison with a case where a plurality of switches are included in each of electrical conduction paths, it is possible to prevent electrical conduction loss from increasing.

According to the aspect of (3) or (4) described above, it is possible to apply a voltage to the electric load including the electric motor, without switching losses of the first switch to the third switch.

According to the aspect of (5) described above, it is possible to prevent voltages applied to the first switch to the third switch from increasing, and to suppress switching losses.

According to the aspect of (6) described above, at a voltage increasing-decreasing time when the voltage of both ends of the reactor is increased and decreased, only the first electric power supply is made to be charged and to be discharged, and thereby a burden of the charge and discharge operations is assigned only to the first electric power supply.

Thereby, it is possible to make the first electric power supply and the second electric power supply as a combination of electric power supplies with different characteristics, which can increase flexibility in the apparatus configuration.

According to the aspect of (7) described above, at the voltage increasing-decreasing time when the voltage of both ends of the reactor is increased and decreased, the first electric power supply and the second electric power supply are made equally to be charged and to be discharged, and thereby it is possible to distribute a burden of the charge and discharge operations equally to the first electric power supply and the second electric power supply.

Thereby, it is possible to suppress a degradation of the first electric power supply and the second electric power supply.

According to the aspect of (8) described above, it is possible to downsize a configuration of a plurality of the reactors, which can reduce the cost required for a configuration.

According to the aspect of (9) described above, the single reactor that is provided between the electric load and any one of the two output terminals can make the first electric power supply and the second electric power supply equally to be charged and to be discharged at the voltage increasing-decreasing time when the voltage of both ends of the reactor is increased and decreased.

Thereby, it is possible to distribute a burden of the charge and discharge operations equally to the first electric power supply and the second electric power supply, which can suppress a degradation of the first electric power supply and the second electric power supply.

According to the aspect of (10) described above, when resolving an unbalance between the voltage of the first electric power supply and the voltage of the second electric power supply, it is possible to prevent an occurrence of charge and discharge operations between the first electric power supply and the second electric power supply that are irrelevant to electric power distribution to the electric load (that is, an occurrence of a state where a current flows from one of the first electric power supply and the second electric power supply with a higher voltage, to the other with a lower voltage, and thereby the voltages of the two converge to be equal).

Thereby, it is possible to output a load current equally from the first electric power supply and the second electric power supply, and to perform efficient electric power distribution to the electric load.

DESCRIPTION OF THE EMBODIMENTS

Hereinafter, an electric power supply apparatus according to an embodiment of the present invention will be described with reference to the drawings.

Figure 1:
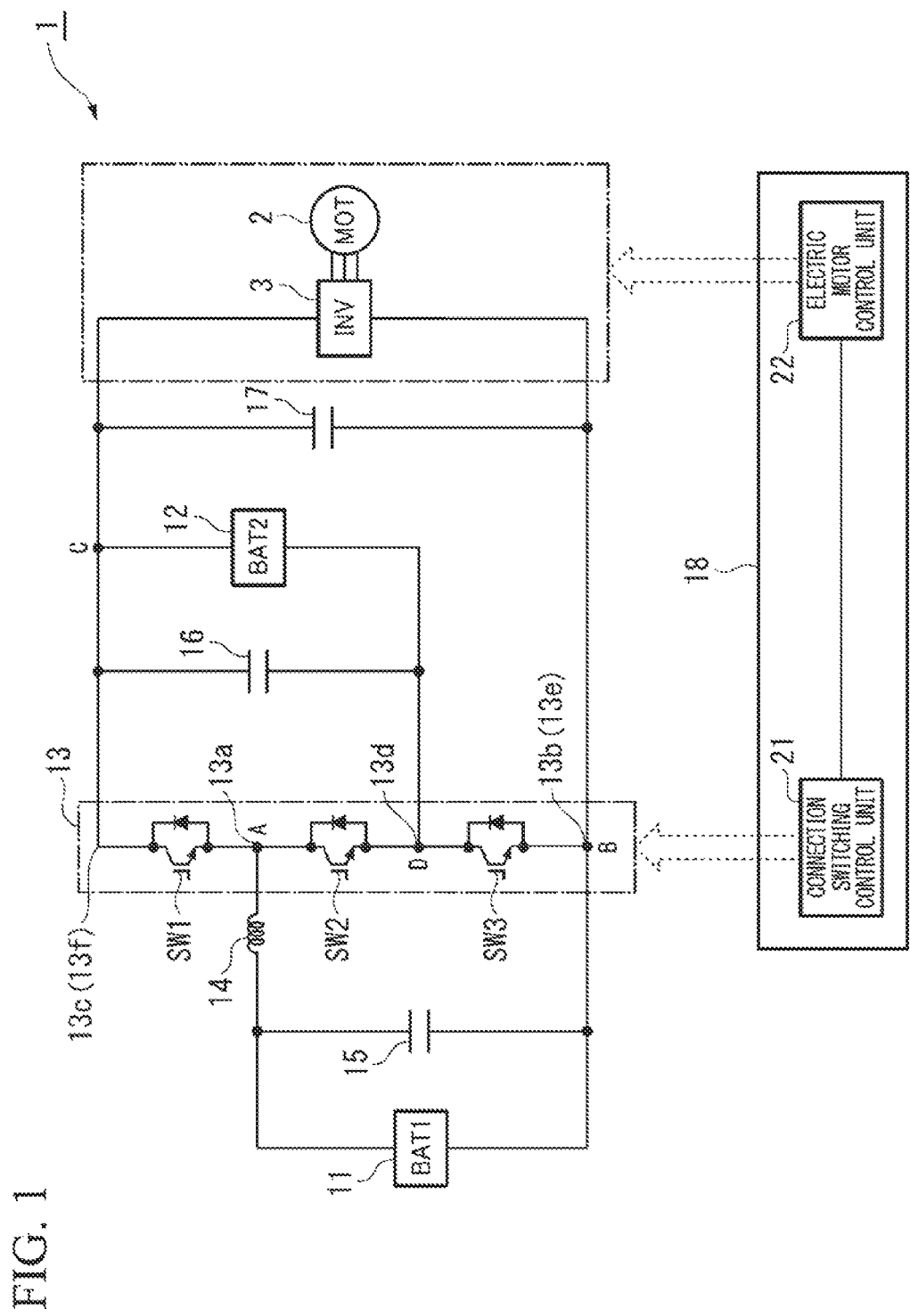
FIG. 1 is a configuration illustration of an electric power supply apparatus according to an embodiment of the present invention.

An electric power supply apparatus 1 according to this embodiment, for example, as shown in FIG. 1, has a configuration of an electric power supply that supplies DC electric power to an inverter 3 which controls driving and regeneration operations of an electric motor (MOT) 2 that generates a driving force to drive a vehicle.

The electric power supply apparatus 1 is, for example, configured to include a first electric power supply 11, a second electric power supply 12, a switch circuit 13, a reactor 14, a first capacitor 15 that is connected to both ends of the first electric power supply 11, a second capacitor 16 that is connected to both ends of the second electric power supply 12, a third capacitor 17 that is connected to both ends of a DC side of the inverter 3, and a control device 18 (voltage control section).

The inverter 3 is connected between two output terminals 13e and 13f of the switch circuit 13.

The first electric power supply 11 is, for example, a battery or the like. A positive terminal of the first electric power supply 11 is connected to a first node A. A negative terminal of the first electric power supply 11 is connected to a second node B.

The second electric power supply 12 is, for example, a battery or the like. A positive terminal of the second electric power supply 12 is connected to a third node C. A negative terminal of the second electric power supply 12 is connected to a fourth node D.

In addition, for example, a voltage VB1 that is output from the first electric power supply 11 is set to be equal to a voltage VB2 that is output from the second electric power supply 12 (VB1=VB2).

The switch circuit 13 includes a first input terminal 13a, a second input terminal 13b, a third input terminal 13c, and a fourth input terminal 13d (four input terminals) that are connected to the first node A, the second node B, the third node C, and the fourth node D, respectively. The switch circuit 13 includes a first output terminal 13e and a second output terminal 13f (two output terminals).

The second input terminal 13b is shared with the first output terminal 13e. The third input terminal 13c is shared with the second output terminal 13f.

The switch circuit 13 includes, for example, three switching devices (for example, IGBT: Insulated Gate Bipolar mode Transistor), namely a first switching device SW1, a second switching device SW2, and a third switching device SW3 that are connected in series.

A collector of the first switching device SW1 (first switch) is connected to the third input terminal 13c. An emitter of the first switching device SW1 is connected to the first input terminal 13a.

A collector of the second switching device SW2 (second switch) is connected to the first input terminal 13a. An emitter of the second switching device SW2 is connected to the fourth input terminal 13d.

A collector of the third switching device SW3 (third switch) is connected to the fourth input terminal 13d. An emitter of the third switching device SW3 is connected to the second input terminal 13b.

A diode is connected between the emitter and the collector of each of the first switching device SW1 the second switching device SW2, and the third switching device SW3, such that a direction from the emitter toward the collector corresponds to a forward direction of the diode.

The switch circuit 13 is, for example, is driven by a pulse-width modulated (pulse width modulation) signal (PWM signal) that is output from the control device 18 and input to a gate of each of the first switching device SW1, the second switching device SW2, and the third switching device SW3.

Figure 2A:
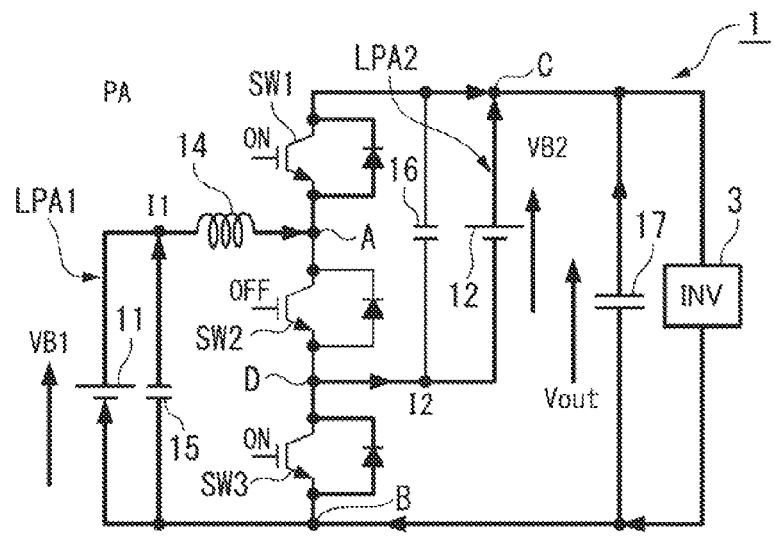
FIG. 2A is an illustration showing a parallel mode as an operation mode of the electric power supply apparatus according to the embodiment of the present invention.

The switch circuit 13, for example, as shown in FIG. 2A, sets the first switching device SW1 and the third switching device SW3 to be closed (ON) and the second switching device SW2 to be open (OFF), in a parallel mode PA as an operation mode of the electric power supply apparatus 1. Thereby, the first electric power supply 11 and the second electric power supply 12 are connected in parallel with the inverter 3.

Figure 2B:
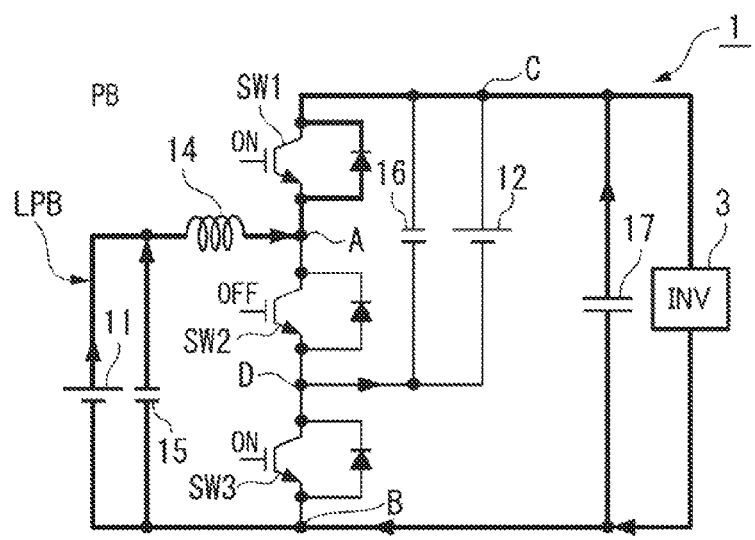
FIG. 2B is an illustration showing a parallel state as the operation mode of the electric power supply apparatus according to the embodiment of the present invention.
Figure 2C:
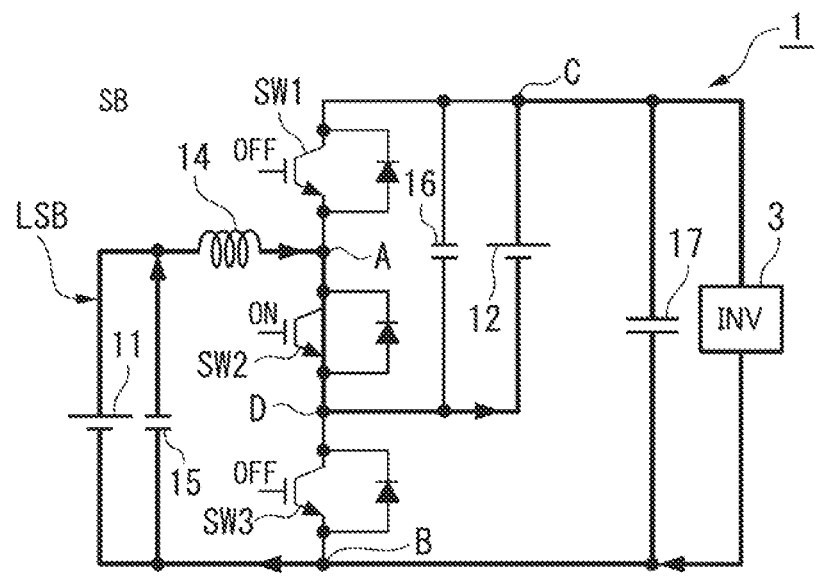
FIG. 2C is an illustration showing a series state as the operation mode of the electric power supply apparatus according to the embodiment of the present invention.
Figure 2D:
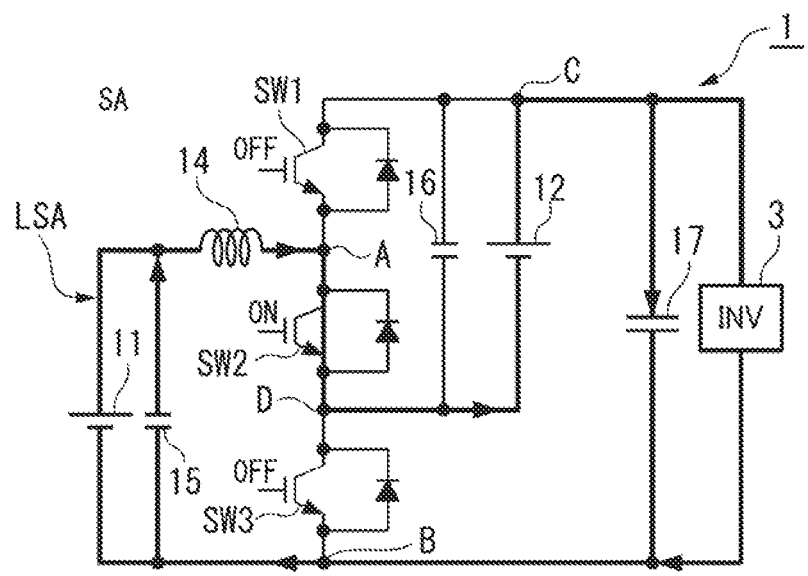
FIG. 2D is an illustration showing a series mode as the operation mode of the electric power supply apparatus according to the embodiment of the present invention.

In addition, the switch circuit 13, for example, as shown in FIG. 2D, sets the first switching device SW1 and the third switching device SW3 to be open (OFF) and the second switching device SW2 to be closed (ON), in a series mode SA as an operation mode of the electric power supply apparatus 1. Thereby, the first electric power supply 11 and the second electric power supply 12 are connected in series with the inverter 3.

The switch circuit 13 alternately switches between a series state SB and a parallel state PB, in a voltage adjustment control that is performed when switching between the parallel mode PA and the series mode SA.

In more detail, the switch circuit 13, for example, as shown in FIG. 21, connects the first node A, the third node C, and the second output terminal 13f, and connects the second node B, the fourth node D, and the first output terminal 13e. Thereby, it is possible to connect the first electric power supply 11 and the second electric power supply 12 in parallel with the inverter 3 to form the parallel state PB.

In addition, the switch circuit 13, for example, as shown in FIG. 2C, connects the first node A and the fourth node D, connects the second node B and the first output terminal 13e, and connects the third node C and the second output terminal 13f. Thereby, it is possible to form a current loop LSB that connects the first electric power supply 11, the second electric power supply 12, and the reactor 14 in series with the inverter 3 to form the series state SB.

The switch circuit 13, for example, in the voltage adjustment control, alternately switches between the series state SB and the parallel state PB, by alternately switching between a first state in which a pair of the first switching device SW1 and the third switching device SW3 is closed and the second switching device SW2 is open, and a second state in which a pair of the first switching device SW1 and the third switching device SW3 is open and the second switching device SW2 is closed.

The reactor 14 is provided between the first electric power supply 11 and the first node A.

In more detail, a first end of the reactor 14 is connected to the positive terminal of the first electric power supply 11. A second end of the reactor 14 is connected between the emitter of the first switching device SW1 and the collector of the second switching device SW2 of the switch circuit 13.

The first capacitor 15 is connected between the positive terminal and the negative terminal of the first electric power supply 11.

The second capacitor 16 is connected between the positive terminal and the negative terminal of the second electric power supply 12.

The third capacitor 17 is connected between a positive terminal and a negative terminal of the DC side of the inverter 3.

The control device 18 is, for example, configured to include a connection switching control unit 21 and an electric motor control unit 22.

The connection switching control unit 21, for example, as shown in FIG. 2A to FIG. 2D, controls the switch circuit 13, in the parallel mode PA and the series mode SA as operation modes of the electric power supply apparatus 1, and in the series state SB and the parallel state PB that are alternately switched in the voltage adjustment control which is performed when switching between the parallel mode PA and the series mode SA.

In more detail, the connection switching control unit 21, for example, alternately switches between the first state in which the pair of the first switching device SW1 and the third switching device SW3 is closed (ON) and the second switching device SW2 is open (OFF), and the second state in which the pair of the first switching device SW1 and the third switching device SW3 is open (OFF) and the second switching device SW2 is closed (ON).

The connection switching control unit 21, for example, in the parallel mode PA, instructs to set the first switching device SW1 and the third switching device SW3 to be closed (ON) and the second switching device SW2 to be open (OFF), to connect the first electric power supply 11 and the second electric power supply 12 in parallel with the inverter 3.

In addition, the connection switching control unit 21, for example, in the series mode SA, instructs to set the first switching device SW1 and the third switching device SW3 to be open (OFF) and the second switching device SW2 to be closed (ON), to connect the first electric power supply 11 and the second electric power supply 12 in series with the inverter 3.

Moreover, the connection switching control unit 21, for example, alternately switches between the series state SB and the parallel state PB, depending on a first ON duty D1 and a second ON duty D2 in a period (switching period) of the PWM signal, in the voltage adjustment control when switching between the parallel mode PA and the series mode SA For example, the first ON duty D1 (=Ton1/(Ton1+Ton2)) and the second ON duty D2 (=Ton2/(Ton1+Ton2)) are defined by an ON time Ton1 of the pair of the first switching device SW1 and the third switching device SW3 and an ON time Ton2 of the second switching device SW2.

The connection switching control unit 21, for example, alternately switches between the series state SB and the parallel state PB, by alternately switching between the first state in which the pair of the first switching device SW1 and the third switching device SW3 is closed (ON) and the second switching device SW2 is open (OFF), and the second state in which the pair of the first switching device SW1 and the third switching device SW3 is open (OFF) and the second switching device SW2 is closed (ON), depending on the first ON duty D1 and the second ON duty D2.

Thereby, the connection switching control unit 21, for example, controls a voltage that is applied to the inverter 3, to fall within a voltage range between a first voltage V1 (=VB1, VB2) that is the voltage of the first electric power supply 11 or the voltage of the second electric power supply 12, and a second voltage V2 (=VB1+VB2) that is the sum of the voltage of the first electric power supply 11 and the voltage of the second electric power supply 12.

The connection switching control unit 21, for example, in the parallel mode PA shown in FIG. 2A, forms a current loop LPA1 that connects the first electric power supply 11 and the first capacitor 15, the reactor 14, the first switching device SW1, and the inverter 3 and the third capacitor 17, in series in this order, by setting the second switching device SW2 to be OFF) and setting the first switching device SW1 to be ON.

Moreover, the connection switching control unit 21 forms a current loop LPA2 that connects the third switching device SW3, the second electric power supply 12, and the inverter 3 and the third capacitor 17, in series in this order, by setting the third switching device SW3 to be ON.

Figure 3A:
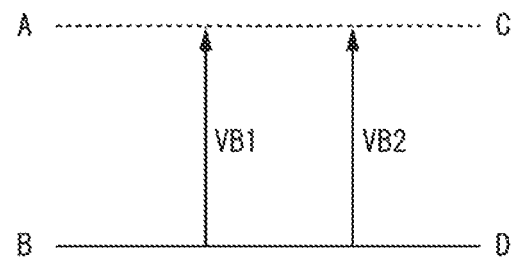
FIG. 3A is an illustration showing electric potentials of respective nodes in the parallel mode as the operation mode of the electric power supply apparatus according to the embodiment of the present invention.

In this parallel mode PA, for example, as shown in FIG. 3A, electric potentials of the first node A and the third node C become equal, electric potentials of the second node B and the fourth node D become equal, and the voltage VB1 of the first electric power supply 11 and the voltage VB2 of the second electric power supply 12 that are equal to each other are applied between the positive terminal and the negative terminal of the DC side of the inverter 3.

In addition, the connection switching control unit 21, for example, in the series mode SA shown in FIG. 21, forms a current loop LSA that connects the first electric power supply 11 and the first capacitor 15, the reactor 14, the second switching device SW2, the second electric power supply 12, and the inverter 3 and the third capacitor 17, in series in this order, by setting the second switching device SW2 to be ON and setting the first switching device SW1 and the third switching device SW3 to be OFF.

Figure 3B:
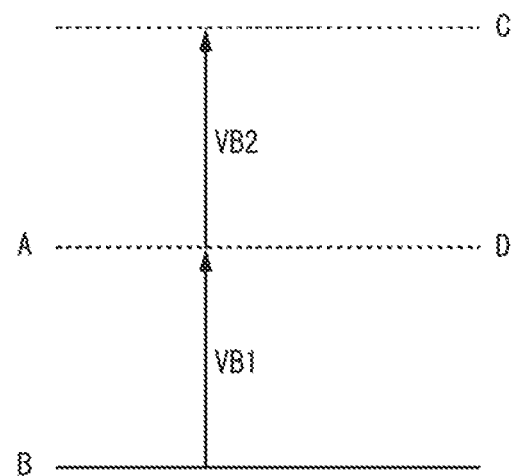
FIG. 3B is an illustration showing electric potentials of respective nodes in the series mode as the operation mode of the electric power supply apparatus according to the embodiment of the present invention.

In this series mode SA, for example, as shown in FIG. 3B, electric potentials of the first node A and the fourth node D become equal, and the sum of the voltage VB1 of the first electric power supply 11 and the voltage VB2 of the second electric power supply 12 is applied between the positive terminal and the negative terminal of the DC side of the inverter 3.

Figure 4:
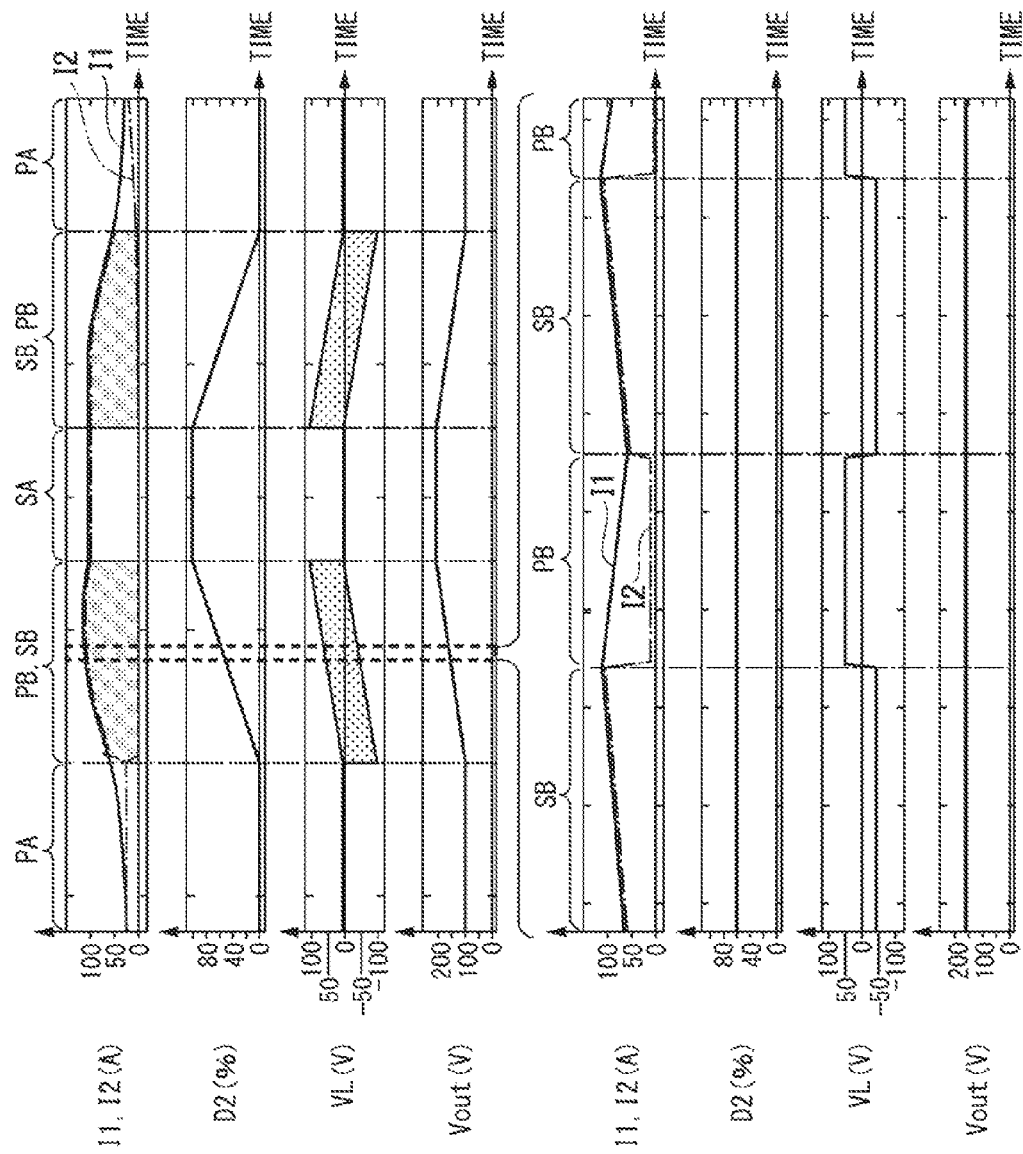
FIG. 4 is an illustration showing a reactor current I1, a second ON duty D2, a voltage of both ends of the reactor VL, and an output voltage Vout, in the parallel mode, the parallel state, the series state, and the series mode, as the operation modes of the electric power supply apparatus according to the embodiment of the present invention.

In addition, the connection switching control unit 21, for example, as shown in FIG. 4, when switching the parallel mode PA to the series mode SA, first switches the parallel mode PA to the series state SB, next alternately switches between the series state SB and the parallel state PB. At this alternate switching, the first ON duty D1 (=Ton1/(Ton1+Tn2)) is gradually changed from 100% to 0%, and the second ON duty D2 (=Ton2/(Ton1+Ton2)) is gradually changed from 0% to 100%.

Thereby, the charge and discharge operations of the first electric power supply 11 excite the reactor 14, which gradually increases a voltage VL of both ends of the reactor 14. Then, an output voltage Vout applied between the positive terminal and the negative terminal of the DC side of the inverter 3 is increased from the voltage VB1 of the first electric power supply 11 to the voltage of the sum of the voltage VB1 of the first electric power supply 11 and the voltage V132 of the second electric power supply 12 (=VB1+ VB2=2×BV1). Then, after this alternate switching, the state is transferred to the series mode SA.

On the other hand, the connection switching control unit 21, for example, when switching the series mode SA to the parallel mode PA, first switches the series mode SA to the parallel state PB, next alternately switches between the parallel state PB and the series state SB. At this alternate switching, the first ON duty D1 (=Ton1/(Ton1+Ton2)) is gradually changed from 0% to 100%, and the second ON duty D2 (=Ton2/(Ton1+Ton2)) is gradually changed from 100% to 0%.

Thereby, the charge and discharge operations of the first electric power supply 11 inversely excite the reactor 14, which gradually decreases the voltage VL of both ends of the reactor 14. Then, the output voltage Vout applied between the positive terminal and the negative terminal of the DC side of the inverter 3 is decreased from the voltage of the sum of the voltage VB1 of the first electric power supply 11 and the voltage VB2 of the second electric power supply 12 (=VB1+ VB2=2×BV1) to the voltage VB1 of the first electric power supply 11. Then, after this alternate switching, the state is transferred to the parallel mode PA.

The connection switching control unit 21, for example, in the series state SB shown in FIG. 2C, forms the current loop LSB that connects the first electric power supply 11 and the first capacitor 15, the reactor 14, the second switching device SW2, the second electric power supply 12, and the inverter 3 and the third capacitor 17, in series in this order.

In this case, for example, as shown in FIG. 4, a current I1 that flows through the reactor 14 (reactor current) becomes equal to a current I2 that flows from the fourth node D through the second electric power supply 12 to the third node C.

In this series state SB, a relation between the voltage VB1 of the first electric power supply 11, an inductance L of the reactor 14, the reactor current I1, the voltage VB2 of the second electric power supply 12, and the output voltage Vout, for example, is as shown in an equation (1) below.

Then, the equation (1) below is transformed into, for example, an equation (2) below. In this equation (2), for example, by setting dI1=a gradient ΔI1P, dt=the second ON duty D2, and the voltage VB1=the voltage VB2, the equation (2) below, for example, is as shown in an equation (3) below.

Figure 5A:
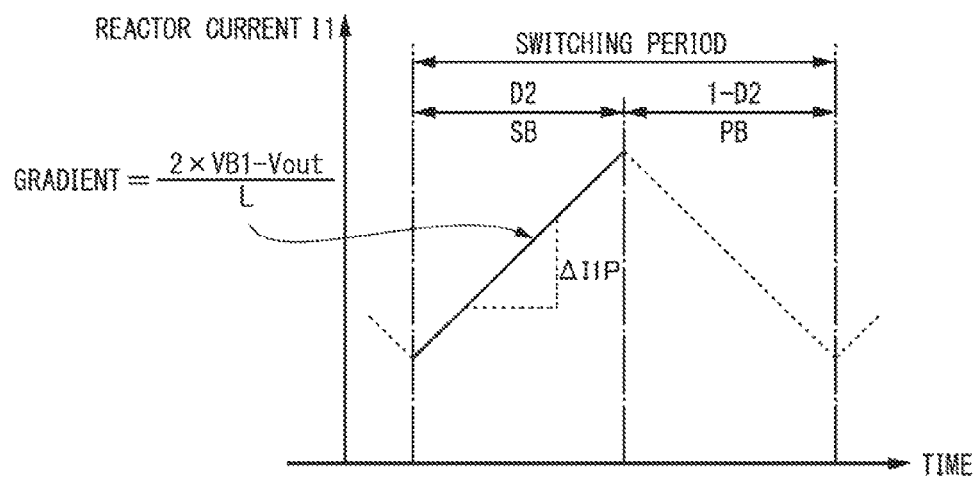
FIG. 5A is an illustration showing the reactor current I1 in the series state (SB) as the operation mode of the electric power supply apparatus according to the embodiment of the present invention.

Accordingly, in the series state SB, the reactor current I1, as shown, for example, in FIG. 5A, increases by the gradient ΔI1P.

[Equation 1]

$$VB1 = L\frac{dI1}{dt} - VB2 + Vout \quad (1)$$

[Equation 2]

$$dI1 = \frac{VB1 + VB2 - Vout}{L}dt \quad (2)$$

[Equation 3]

$$\Delta I1P = \frac{2 \times VB1 - Vout}{L}D2 \quad (3)$$

In addition, the connection switching control unit 21, for example, in the parallel state PB shown in FIG. 2B, forms a current loop LPB that connects the first electric power supply 11 and the first capacitor 15, the reactor 14, the first switching device SW1, and the inverter 3 and the third capacitor 17, in this order.

In this case, for example, as shown in FIG. 4, the current I2 that flows from the fourth node D through the second electric power supply 12 to the third node C becomes zero.

In this parallel state PB, a relation between the voltage VB1 of the first electric power supply 11, the inductance L of the reactor 14, the reactor current I1, and the output voltage Vout, for example, is as shown in an equation (4) below.

Then, the equation (4) below is transformed into, for example, an equation (5) below, and in this equation (5), for example, by setting dI1=a gradient ΔI1S and dt=the first ON duty D1 (=1−D2), the equation (5) below, for example, is as shown in an equation (6) below.

Figure 5B:
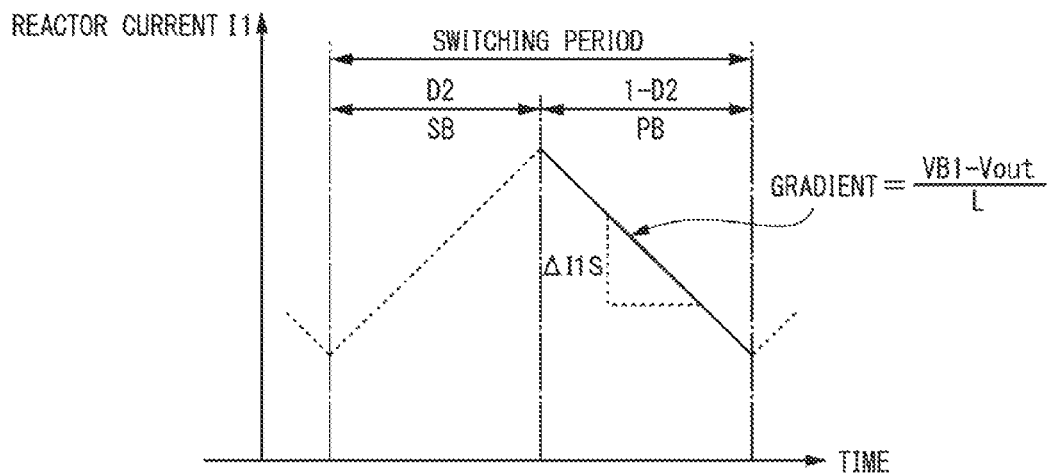
FIG. 5B is an illustration showing the reactor current I1 in the parallel state (PB) as the operation mode of the electric power supply apparatus according to the embodiment of the present invention.

Accordingly, in the parallel state PB, the reactor current I1, as shown, for example, in FIG. 5B, decreases by the gradient ΔI1S.

[Equation 4]

$$VB1 = L\frac{dI1}{dt} + Vout \quad (4)$$

[Equation 5]

$$dI1 = \frac{VB1 - Vout}{L}dt \quad (5)$$

[Equation 6]

$$\Delta I1S = \frac{VB1 - Vout}{L}(1 - D2) \quad (6)$$

Then, at the alternate switching between the series state SB and the parallel state PB, as shown, for example, in an equation (7) below, the sum of the gradient ΔI1P and the gradient ΔI1S becomes zero, and the equation (7) below is transformed into, for example, equations (8) and (9) below.

Accordingly, the output voltage Vout is described by the voltage VB1 of the first electric power supply 11 and the second ON duty D2, as shown in the equation (9) below.

[Equation 7]

$$\Delta I1P + \Delta I1S = 0 \quad (7)$$

[Equation 8]

$$\frac{2 \times VB1 - Vout}{L}D2 + \frac{VB1 - Vout}{L}(1 - D2) = 0 \quad (8)$$

[Equation 9]

$$Vout = (D2 + 1)VB1 \quad (9)$$

The electric motor control unit 22, for example, at the driving operation of the electric motor 2 that is a three-phase brushless DC motor or the like, transforms DC electric power that is applied between the positive terminal and negative terminal of the DC side of the inverter 3 into three-phase AC electric power, and distribute each phase of AC currents by sequentially switching conduction to each phase of the electric motor 2. On the other hand, for example, at the regeneration operation of the electric motor 2, the electric motor control unit 22 transforms generated AC electric power that is output from the electric motor 2 into DC electric power in synchronization based on a rotation angle of the electric motor 2.

The electric power supply apparatus 1 according to the embodiment of the present invention includes the above configuration, and next, an operation of the electric power supply apparatus 1, specifically, a process that alternately switches between the series state SB and the parallel state PB will be described.

Figure 6:
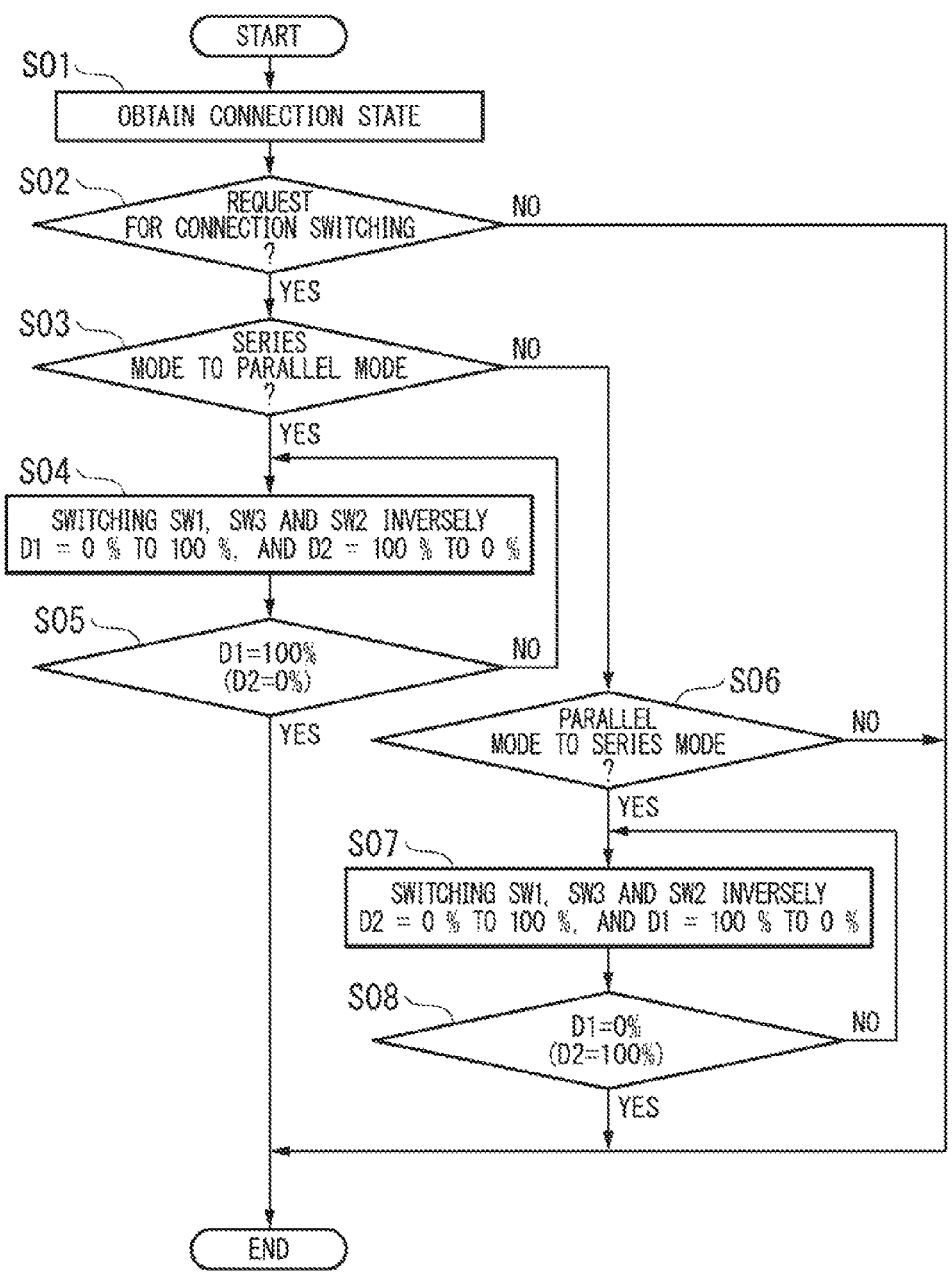
FIG. 6 is a flowchart showing an operation of the electric power supply apparatus according to the embodiment of the present invention.

First, for example, in a step S01 shown in FIG. 6, the routine obtains a connection state of the switch circuit 13 corresponding to the operation mode of the electric power supply apparatus 1 (namely, the parallel mode RPA or the series mode SA).

Next, in a step S02, the routine determines whether there is a request for switching of the connection state of the switch circuit 13 in accordance with switching of the operation mode of the electric power supply apparatus 1 or not.

In a case that this determination result is "NO", the routine proceeds to END.

On the other hand, in a case that this determination result is "YES", the routine proceeds to a step S03.

Then, in the step S03, the routine determines whether the request for switching of the connection state of the switch circuit 13 is a request for switching from the series mode SA to the parallel mode PA or not.

In a case that this determination result is "NO", the routine proceeds to a step S06 described later.

On the other hand, in a case that this determination result is "YES", the routine proceeds to a step S04.

Then, in the step S04, by alternately switching between the first state in which the pair of the first switching device SW1 and the third switching device SW3 is closed and the second switching device SW2 is open, and the second state in which the pair of the first switching device SW1 and the third switching device SW3 is open and the second switching device SW2 is closed, the first ON duty D1 is gradually changed from 0% to 100%, and the second ON duty D2 is gradually changed from 100% to 0%.

Next, in a step S05, the routine determines whether the first ON duty D1 is 100% and the second ON duty D2 is 0% or not.

In a case that this determination result is "NO", the routine returns to the above step S04.

On the other hand, in a case that this determination result is "YES", the routine proceeds to END.

In addition, in the step S06, the routine determines whether the request for switching of the connection state of the switch circuit 13 is a request for switching from the parallel mode PA to the series mode SA or not.

In a case that this determination result is "NO", the routine proceeds to END.

On the other hand, in a case that this determination result is "YES", the routine proceeds to a step S07.

Then, in the step S07, by alternately switching between the first state in which the pair of the first switching device SW1 and the third switching device SW3 is closed and the second switching device SW2 is open, and the second state in which the pair of the first switching device SW1 and the third switching device SW3 is open and the second switching device SW2 is closed, the first ON duty D1 is gradually changed from 100% to 0%, and the second ON duty D2 is gradually changed from 0% to 100%.

Next, in a step S08, the routine determines whether the first ON duty D1 is 0% and the second ON duty D2 is 100% or not.

In a case that this determination result is "NO" the routine returns to the above step S07.

On the other hand, in a case that this determination result is "YES", the routine proceeds to END.

(First Modified Example)

Figure 7:
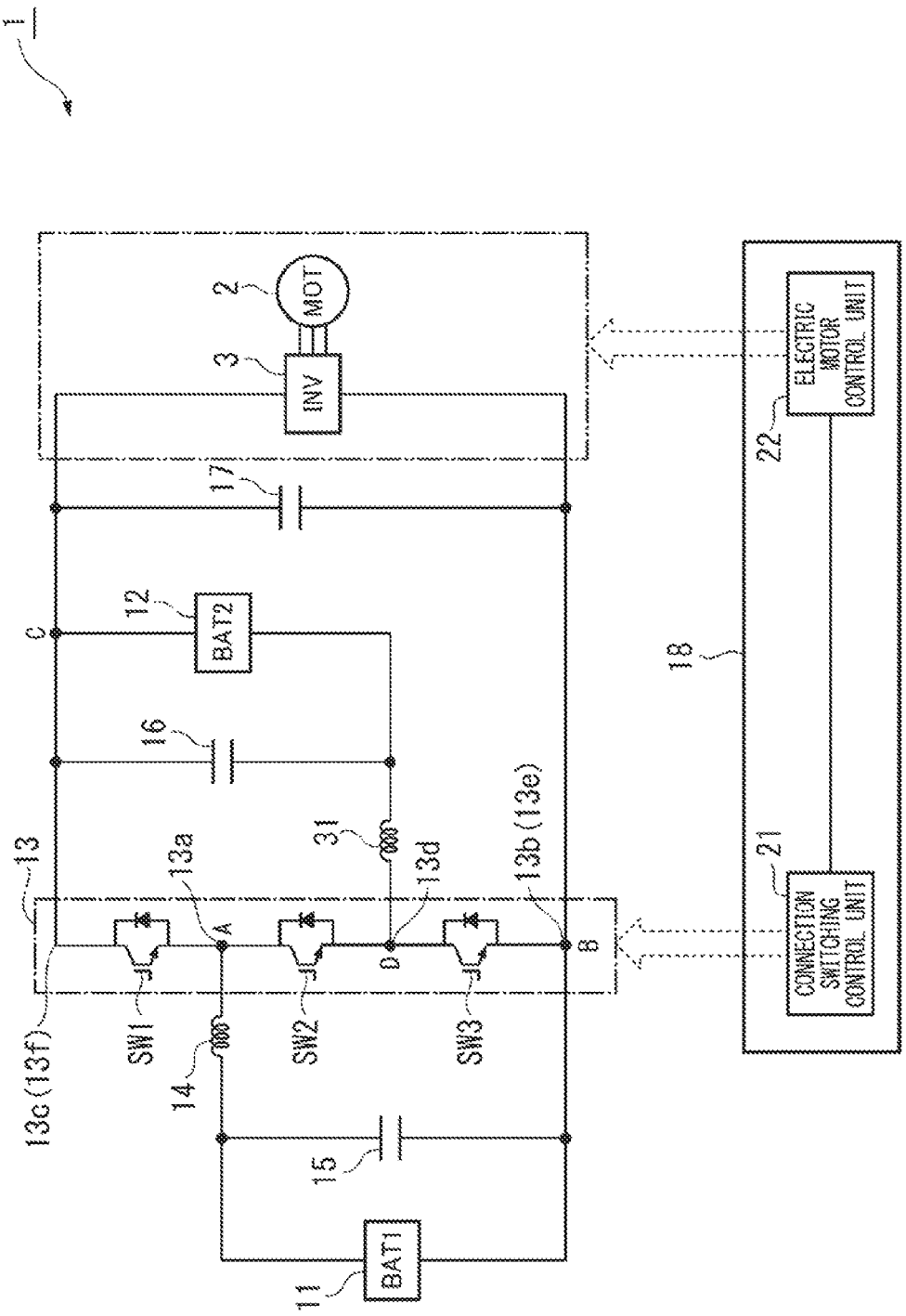
FIG. 7 is a configuration illustration of an electric power supply apparatus according to a first modified example of the embodiment of the present invention.

In addition, in the embodiment described above, considering the electric power supply apparatus 1, for instance, shown in FIG. 1 as an example, as the electric power supply apparatus 1 according to a first modified example, for instance, shown in FIG. 7, the electric power supply apparatus 1 may include a second reactor 31 that is provided between the fourth node D and the second electric power supply 12.

More specifically, a first end of the second reactor 31 is connected between the emitter of the second switching device SW2 and the collector of the third switching device SW3 of the switch circuit 13, and a second end of the second reactor 31 is connected to the negative terminal of the second electric power supply 12.

Figure 8:
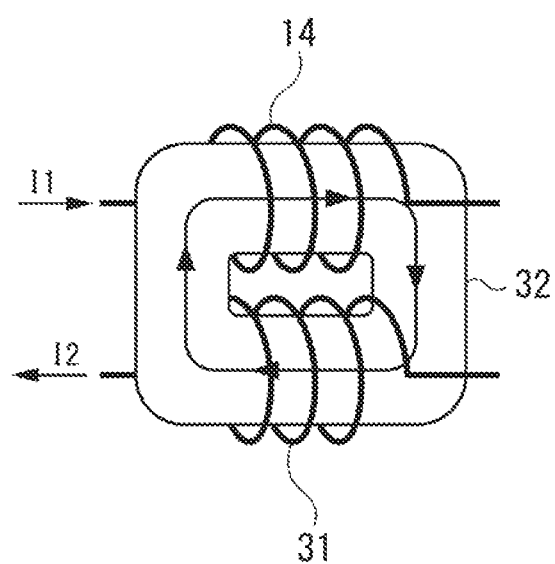
FIG. 8 is a configuration illustration of a reactor and a second reactor of the electric power supply apparatus according to the first modified example of the embodiment of the present invention.

In addition, in this first modified example, the reactor 14 and the second reactor 31 are, for example, as shown in FIG. 8, may be magnetically coupled by being wound around a common core 32 such that the magnetic paths are shared.

Figure 9A:
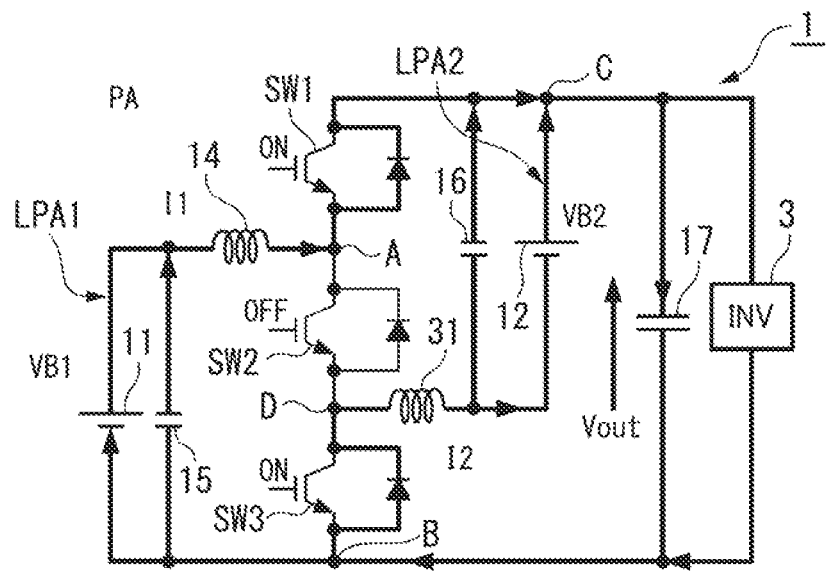
FIG. 9A is an illustration showing a parallel mode as an operation mode of the electric power supply apparatus according to the first modified example of the embodiment of the present invention.

In this first modified example, the switch circuit 13, for example, as shown in FIG. 9A, in the parallel mode PA as the operation mode of the electric power supply apparatus 1, sets the first switching device SW1 and the third switching device SW3 to be closed (ON) and the second switching device SW2 to be open (OFF). Thereby, the first electric power supply 11 and the second electric power supply 12 are connected in parallel with the inverter 3.

Figure 9B:
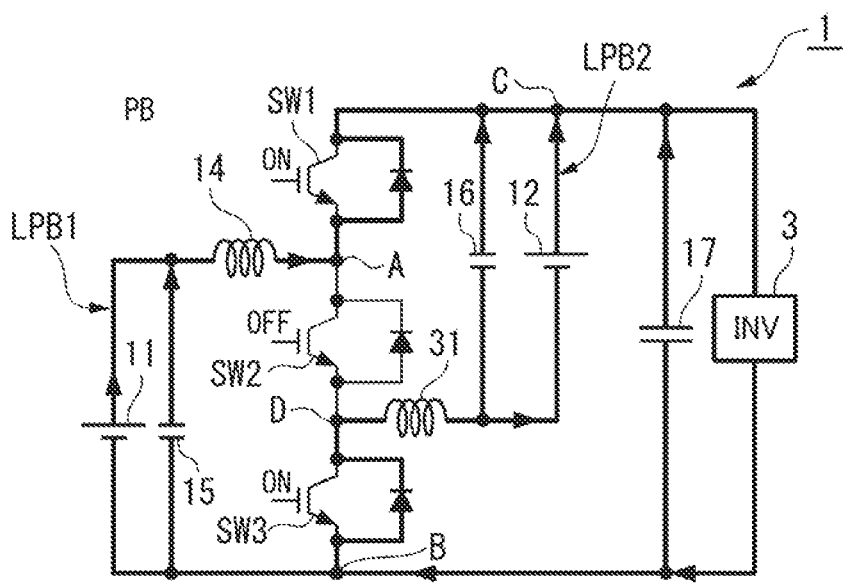
FIG. 9B is an illustration showing a parallel state as the operation mode of the electric power supply apparatus according to the first modified example of the embodiment of the present invention.
Figure 9C:
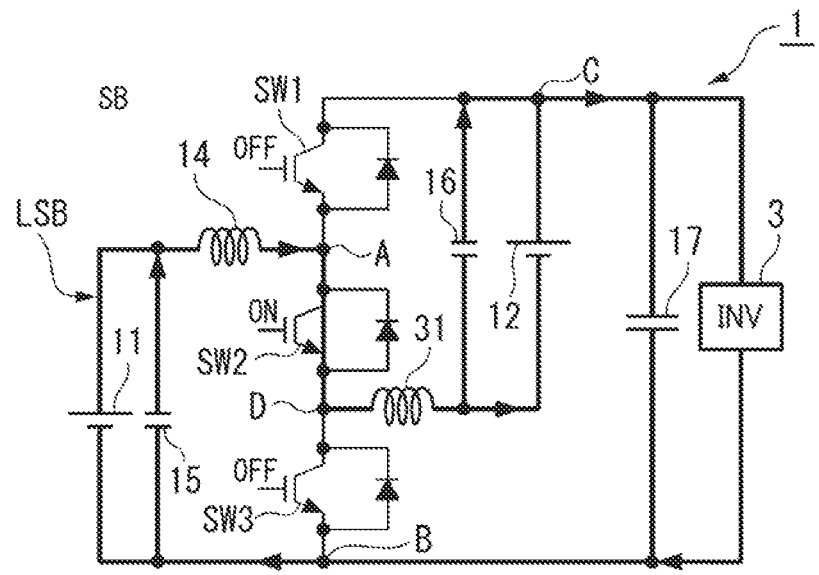
FIG. 9C is an illustration showing a series state as the operation mode of the electric power supply apparatus according to the first modified example of the embodiment of the present invention.
Figure 9D:
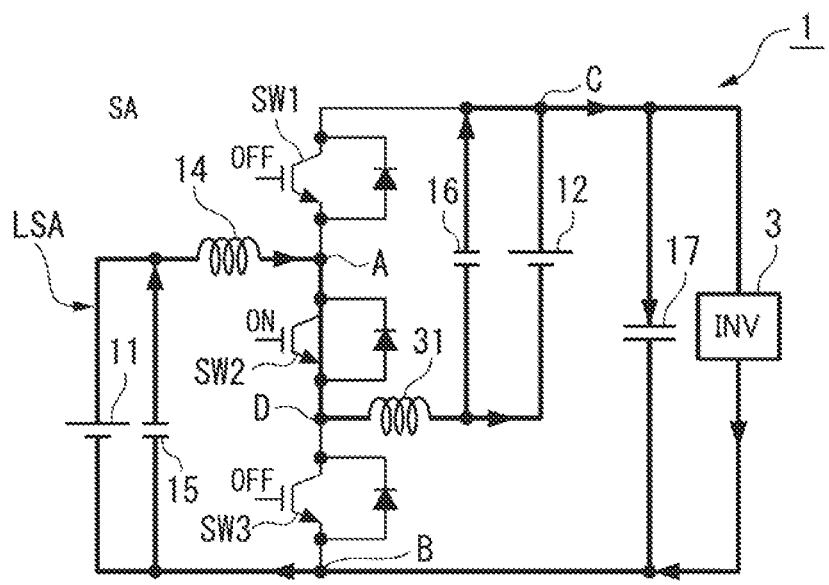
FIG. 9D is an illustration showing a series mode as the operation mode of the electric power supply apparatus according to the first modified example of the embodiment of the present invention.

In addition, the switch circuit 13, for example, as shown in FIG. 9D, in the series mode SA as the operation mode of the electric power supply apparatus 1, sets the first switching device SW1 and the third switching device SW3 to be open (OFF) and the second switching device SW2 to be closed (ON). Thereby, the first electric power supply 11 and the second electric power supply 12 are connected in series with the inverter 3.

Then, the switch circuit 13 alternately switches between the series state SB and the parallel state PB in the voltage adjustment control that is performed when switching between the parallel mode PA and the series mode SA.

In more detail, the switch circuit 13, for example, as shown in FIG. 9B, connects the first node A, the third node C, and the second output terminal 13f, and connects the second node B, the fourth node D, and the first output terminal 13e.

Thereby, it is possible to connect the first electric power supply 11 and the second electric power supply 12 in parallel with the inverter 3 to form the parallel state PB in which the voltages of both ends of the reactor 14 and the second reactor 31 are decreased.

In addition, the switch circuit 13, for example, as shown in FIG. 9C, connects the first node A and the fourth node D, connects the second node B and the first output terminal 13e, and connects the third node C1 and the second output terminal 13f.

Thereby, it is possible to form a current loop that connects the first electric power supply 11, the second electric power supply 12, the reactor 14, and the second reactor 31 in series with the inverter 3 to form the series state S13 in which the voltages of both ends of the reactor 14 and the second reactor 31 are increased.

Then, the switch circuit 13, for example, in the voltage adjustment control, alternately switches between the series state SB and the parallel state PB, by alternately switching between the first state in which the pair of the first switching device SW1 and the third switching device SW3 is closed and the second switching device SW2 is open, and the second state in which the pair of the first switching device SW1 and the third switching device SW3 is open and the second switching device SW2 is closed.

In this first modified example, the connection switching control unit 21 of the control device 18, for example, in the parallel mode PA shown in FIG. 9A, forms the current loop LPA1 that connects the first electric power supply 11 and the first capacitor 15, the reactor 14, the first switching device SW1, and the inverter 3 and the third capacitor 17, in series in this order, by setting the second switching device SW2 to be OFF and setting the first switching device SW1 to be ON.

Moreover, the connection switching control unit 21 forms the current loop LPA2 that connects the third switching device SW3, the second electric power supply 12 and the second capacitor 16, and the inverter 3 and the third capacitor 17, in series in this order, by setting the third switching device SW3 to be ON.

In addition, the connection switching control unit 21, for example, in the series mode SA shown in FIG. 9D, forms the current loop LSA that connects the first electric power supply 11 and the first capacitor 15, the reactor 14, the second switching device SW2, the second reactor 31, the second electric power supply 12 and the second capacitor 16, and the inverter 3 and the third capacitor 17, in series in this order, by setting the second switching device SW2 to be ON and setting the first switching device SW1 and the third switching device SW3 to be OFF.

Figure 10:
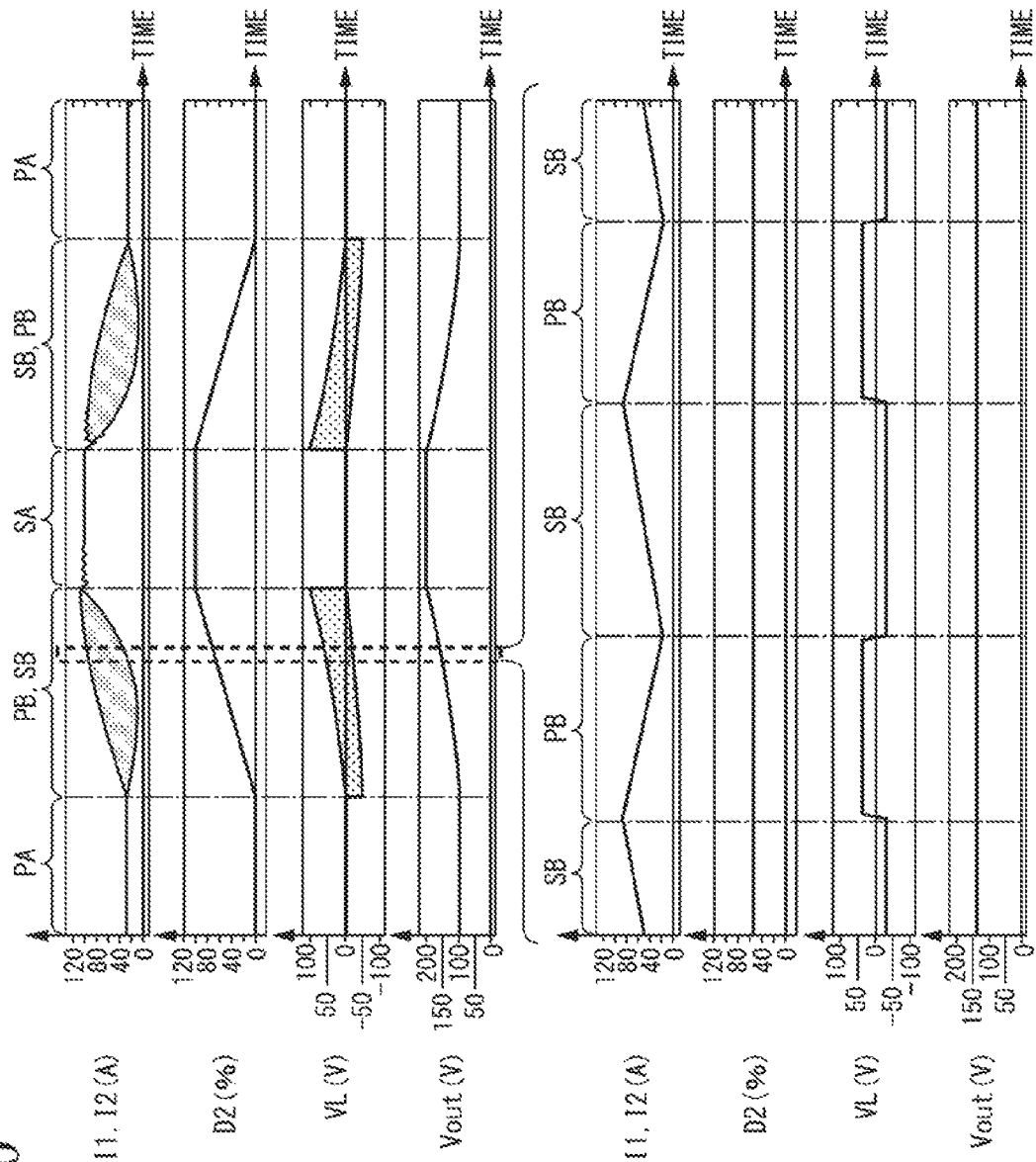
FIG. 10 is an illustration showing a reactor current I1, a second ON duty D2, a voltage of both ends of the reactor VL, an output voltage Vout, in the parallel mode, the parallel state, the series state, and the series mode, as the operation modes of the electric power supply apparatus according to the first modified example of the embodiment of the present invention.

In addition, the connection switching control unit 21, for example, as shown in FIG. 10, when switching the parallel mode PA to the series mode SA, first switches the parallel mode PA to the series state SB, next alternately switches between the series state SB and the parallel state PB. At this alternate switching, the first ON duty D1 (=Ton1/(Ton1+Tn2)) is gradually changed from 100% to 0%, and the second ON duty D2 (=Ton2/(Ton1+Ton2)) is gradually changed from 0% to 100%.

Thereby, the charge and discharge operations of the first electric power supply 11 and the second electric power supply 12 excite the reactor 14 and the second reactor 31, which gradually increases the voltage VL of both ends of the reactor 14 and the voltage of both ends of the second reactor 31. Then, the output voltage Vout applied between the positive terminal and the negative terminal of the DC side of the inverter 3 is increased from the voltage VB1 of the first electric power supply 11 to the voltage of the sum of the voltage VB1 of the first electric power supply 11 and the voltage VB2 of the second electric power supply 12 (=VB1+VB2=2×BV1). Then, after this alternate switching, the state is transferred to the series mode SA.

On the other hand, the connection switching control unit 21, for example, when switching the series mode SA to the parallel mode PA, first switches the series mode SA to the parallel state PB, next alternately switches between the parallel state PB and the series state SB. At this alternate switching, the first ON duty D1 (=Ton1/(Ton1+Ton2)) is gradually changed from 0% to 100%, and the second ON duty D2 (=Ton2/(Ton1+Ton2)) is gradually changed from 100% to 0%.

Thereby, the charge and discharge operations of the first electric power supply 11 and the second electric power supply 12 inversely excite the reactor 14 and the second reactor 31, which gradually decreases the voltage V1, of both ends of the reactor 14 and the voltage of both ends of the second reactor 31. Then, the output voltage Vout applied between the positive terminal and the negative terminal of the DC side of the inverter 3 is decreased from the voltage of the sum of the voltage VB1 of the first electric power supply 11 and the voltage VB2 of the second electric power supply 12 (=VB1+VB2=2×BV1) to the voltage VB1 of the first electric power supply 11. Then, after this alternate switching, the state is transferred to the parallel mode PA.

The connection switching control unit 21, for example, in the series state SB shown in FIG. 9C forms the current loop LSB that connects the first electric power supply 11 and the first capacitor 15, the reactor 14, the second switching device SW2, the second reactor 31, the second electric power supply 12 and the second capacitor 16, and the inverter 3 and the third capacitor 17, in series in this order.

In this case, for example, as shown in FIG. 10, the current I1 that flows through the reactor 14 (reactor current) becomes equal to a current I2 that flows through the second reactor 31 (second reactor current).

In this series state SB, a relation between the voltage VB1 of the first electric power supply 11, the inductance L1 of the reactor 14, the reactor current I1, the inductance L2 of the second reactor 31, the second reactor current I2, the voltage VB2 of the second electric power supply 12, and the output voltage Vout, for example, is as shown in an equation (10) below.

Then, the equation (10) below is transformed, for example, by setting the inductance L1=the inductance L2, into an equation (11) below. In this equation (11), for example, by setting dI1=the gradient ΔI1P, dt=the second ON duty D2, and the voltage VB1=the voltage VB2, the equation (11) below, for example, is as shown in an equation (12) below.

Figure 11A:
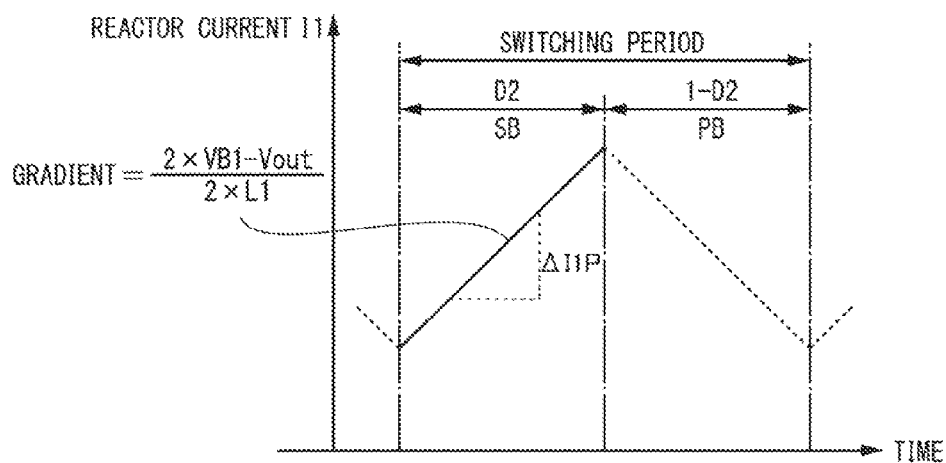
FIG. 11A is an illustration showing the reactor current I1 in the series state as the operation mode of the electric power supply apparatus according to the first modified example of the embodiment of the present invention.

Accordingly, in the series state SB, the reactor current I1, as shown, for example, in FIG. 11A, increases by the gradient ΔI1P.

[Equation 10]

$$VB1 = L1\frac{dI1}{dt} + L2\frac{dI2}{dt} - VB2 + Vout \qquad (10)$$

[Equation 11]

$$dI1 = \frac{VB1 + VB2 - Vout}{2 \times L1}dt \qquad (11)$$

[Equation 12]

$$\Delta I1P = \frac{2 \times VB1 - Vout}{2 \times L1}D2 \qquad (12)$$

In addition, the connection switching control unit 21, for example, in the parallel state PB shown in FIG. 9B, forms a current loop LPB1 that connects the first electric power supply 11 and the first capacitor 15, the reactor 14, the first switching device SW, and the inverter 3 and the third capacitor 17, in this order.

Moreover, the connection switching control unit 21 forms a current loop LPB2 that connects the third switching device SW3, the second reactor 31, the second electric power supply 12 and the second capacitor 16, and the inverter 3 and the third capacitor 17, in this order.

In this case, for example, as shown in FIG. 10, the current I1 that flows through the reactor 14 (reactor current) becomes equal to the current I2 that flows through the second reactor 31 (second reactor current).

In this parallel state PB, a relation between the voltage VB1 of the first electric power supply 11, the inductance L of the reactor 14, the reactor current I1, the output voltage Vout, for example, is as shown in an equation (13) below.

Then, the equation (13) below is transformed into, for example, an equation (14) below, and in this equation (14), for example, by setting dI1=the gradient ΔI1S and dt=the first ON duty D1 (=1−D2), the equation (14) below; for example, is as shown in an equation (15) below.

Figure 11B:
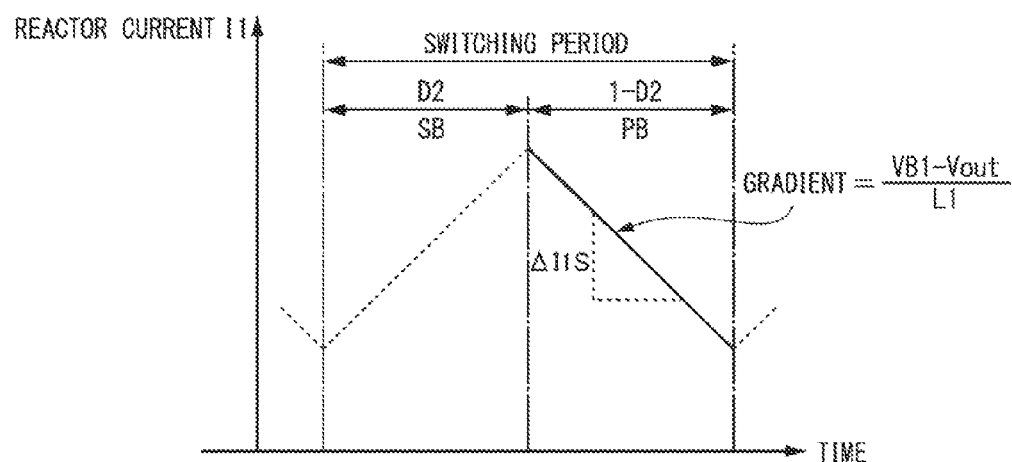
FIG. 11B is an illustration showing the reactor current I1 in the parallel state as the operation mode of the electric power supply apparatus according to the first modified example of the embodiment of the present invention.

Accordingly, in the parallel state PB, the reactor current I1, as shown, for example, in FIG. 11B, decreases by the gradient ΔI1S.

[Equation 13]

$$VB1 = L\frac{dI1}{dt} + Vout \qquad (13)$$

[Equation 14]

$$dI1 = \frac{VB1 - Vout}{L1}dt \qquad (14)$$

[Equation 15]

$$\Delta I1S = \frac{VB1 - Vout}{L1}(1 - D2) \qquad (15)$$

Then, at the alternate switching between the series state SB and the parallel state PB, for example, as shown in an equation (16) below, the sum of the gradient ΔI1P and the gradient ΔI1S becomes zero, and the equation (16) below is transformed into, for example, equations (17) and (18) below.

Accordingly, the output voltage Vout is described by the voltage VB1 of the first electric power supply 11 and the second ON duty D2, as shown in the equation (18) below.

[Equation 16]

$$\Delta I1P + \Delta I1S = 0 \qquad (16)$$

[Equation 17]

$$\frac{2 \times VB1 - Vout}{2 \times L1}D2 + \frac{VB1 - Vout}{L1}(1 - D2) = 0 \qquad (17)$$

[Equation 18]

$$Vout = \frac{2 \times VB1}{2 - D2} \qquad (18)$$

In addition, in the example and the first modified example of the embodiment described above, the reactor 14 may be provided between the first electric power supply 11 and the second node B3.

Also, in the first modified example of the embodiment described above, the second reactor 31 may be provided between the second electric power supply 12 and the third node C.

Figure 12A:
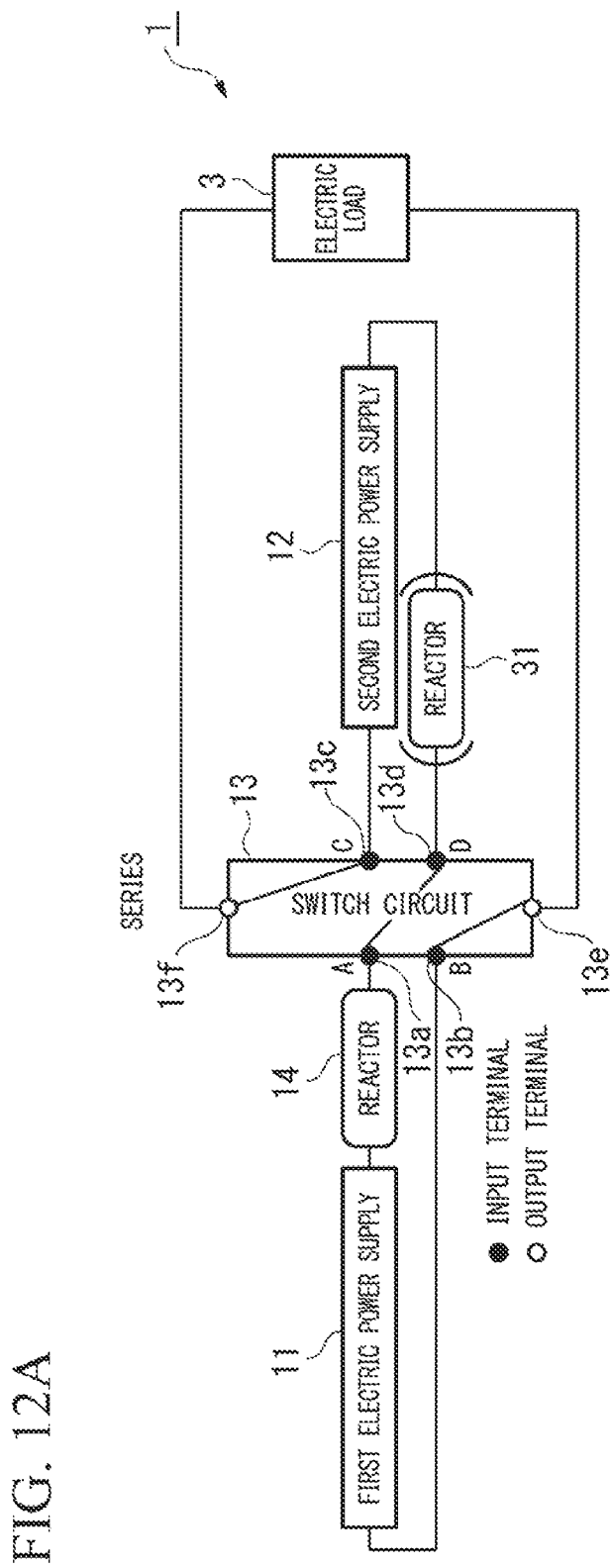
FIG. 12A is an illustration showing a main configuration of the electric power supply apparatus according to the embodiment of the present invention.
Figure 12B:
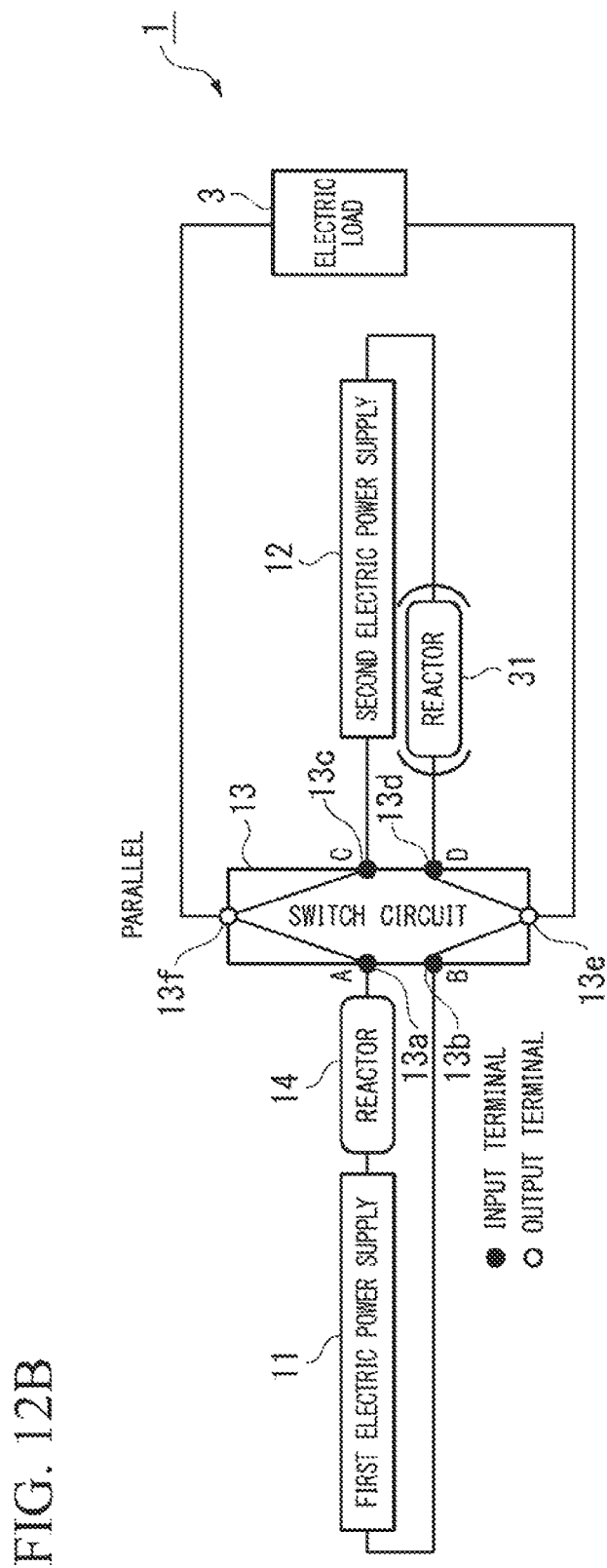
FIG. 12B is an illustration showing a main configuration of the electric power supply apparatus according to the embodiment of the present invention.

As described above, the electric power supply apparatus 1 according to the example and the first modified example of the embodiment of the present invention, for example, as shown in FIGS. 12A and 12B, includes the first electric power supply 11 that is connected between the first node A and the second node B, the second electric power supply 12 that is connected between the third node C and the fourth node D, the switch circuit 13 having four input terminals 13a, 13b, 13c, and 13d which are connected to the first node A, the second node B, the third node C, and the fourth node D, respectively, and two output terminals 13e and 13f, the electric load that consists of the inverter 3 and that is connected between the two output terminals 13e and 13f, and the reactor 14 that is provided between the first electric power supply 11 and one of the first node A and the second node B.

In addition, the electric power supply apparatus 1 alternately switches between the series state SB in which the voltage between both ends of the reactor 14 is increased by connecting the first node A with the fourth node D, connecting the second node 13 with the first output terminal 13e, and connecting the third node C with the second output terminal 13f, to form the current loop that connects the first electric power supply 11, the second electric power supply 12, and the reactor 14 in series with the electric load, and the parallel state PB in which the voltage between both ends of the reactor 14 is decreased by connecting the first node A and the third node C with the second output terminal 13f, and connecting the second node 1B and the fourth node D with the first output terminal 13e, to connect the first electric power supply 11 and the second electric power supply 12 in parallel with the electric load.

According to the electric power supply apparatus 1 of the example and the first modified example of this embodiment, it is possible to finely tune the voltage applied to the inverter 3 corresponding to a load of the electric motor 2 that is the electric load, and thereby a desired power performance can be obtained. In addition, it is possible to prevent the applied voltage from being excessive, and thereby a driving efficiency of the electric motor 2 and the inverter 3 can be improved.

Moreover, by configuring the switch circuit 13 to include three switching devices, i.e. the first switching device SW1, the second switching device SW2, and the third switching device SW3, it is possible to prevent electric power supply apparatus 1 from being larger and prevent the cost required for a configuration from increasing, compared to a case in which, for example, four or more switching devices are included.

Furthermore, in each of the current loops LPA1, LPA2, LSA, LPB, LPB1, LPB2, and LSB that are formed in the parallel mode PA, the series mode SA, the parallel state PB, and the series state SB, one switching device is only included in each of the electrical conduction paths. Thereby, it is possible to prevent the electrical conduction loss from increasing, compared to a case in which, for example, a plurality of switching devices are included in the electrical conduction path.

In addition, when alternately switching between the series state SB and the parallel state PB in the voltage adjustment control for switching between the parallel mode PA and the series mode SA, in comparison with, for example, a case where a current loop that connects each of the electric power supplies in series only with the reactor is formed, it is possible to suppress the increase of the total interlinkage magnetic flux associated with the increase of the voltage boost rate, to prevent the increase of the loss, and to downsize the reactor 14 and the second reactor 31.

Figures 13A, 13B:
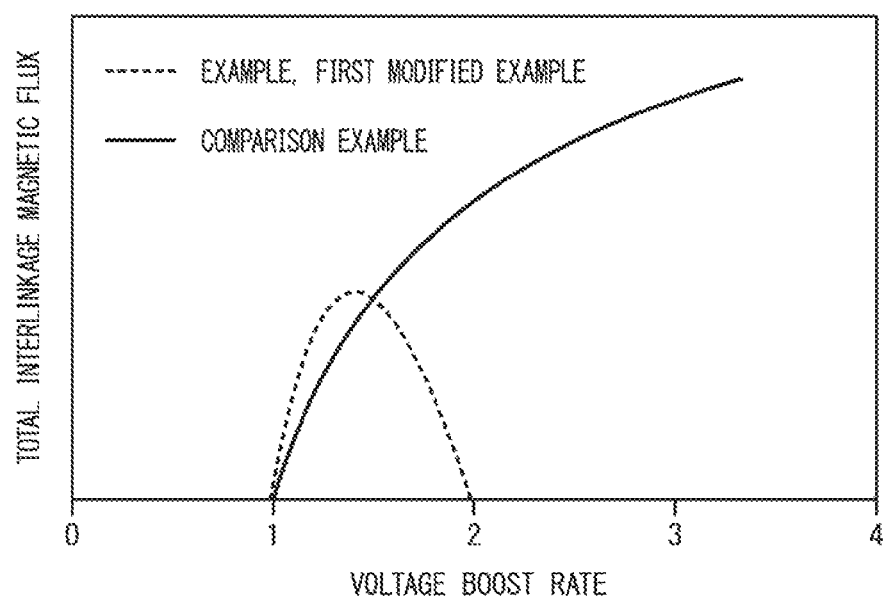
FIG. 13A is an illustration showing a relationship between a voltage boost rate and a total interlinkage magnetic flux of a reactor in the example, the first modified example, and a comparison example of the embodiment of the present invention.
FIG. 13B is an illustration for explaining the relationship between the voltage boost rate and the total interlinkage magnetic flux of the reactor in the example, the first modified example, and the comparison example of the embodiment of the present invention.

For example, as shown in FIGS. 13A and 13B, when a switching operation between a voltage boost operation in the parallel connection mode and a voltage boost operation in the series connection mode of the electric power supply system according to the above Japanese Unexamined Patent Application Publication No. 2012-070514 is considered as a comparison example, in this comparison example the total interlinkage magnetic flux at a peak current of the reactor changes to an increasing tendency corresponding to an increase of the voltage boost rate.

On the other hand, according to the example and the first modified example of the embodiment of the present invention described above, the total interlinkage magnetic flux at a peak current of the reactor changes to an decreasing tendency when the voltage boost rate exceeds about 1.5. Thereby, compared to the comparison example, it is possible to suppress a change of a maximum magnetic flux and the loss of the reactor 14 and the second reactor 31, and to downsize the converter.

Specifically, when considering the electric power supply apparatus 1 as an electric power supply for vehicles, in most cases a required voltage boost rate falls within a range of 1.5 to 2, and thus applicability to the vehicles can be improved.

Figure 14:
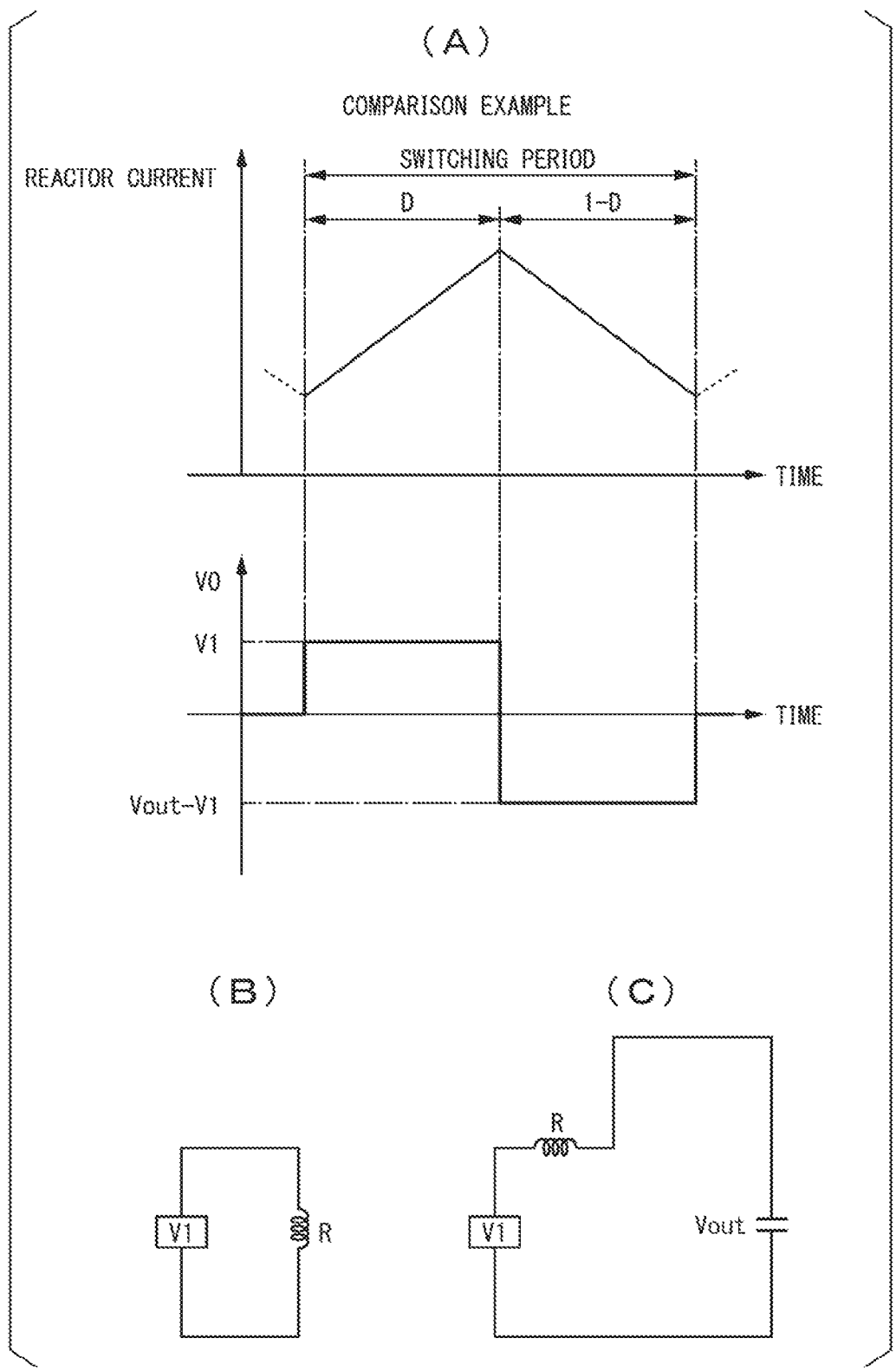
FIG. 14 is an illustration showing a change of a reactor current and a voltage of both ends of a reactor in a boost operation in a parallel connection mode according to the comparison example of the embodiment of the present invention.

In addition, in the voltage boost operation in the parallel connection mode of the comparison example, for example, as shown in FIG. 14 (A) to (C), a current loop that connects a single electric power supply (a voltage=V1) in series with a reactor (R), and a current loop that connects the single electric power supply (a voltage=V1) and the reactor (R) in series with an output section (an output voltage=Vout) are switched with a duty D and a duty (1−D), respectively. Thereby; a total interlinkage magnetic flux (=cV0×time) at a peak current of the reactor (R) becomes the voltage V1×the duty D.

Figure 15:
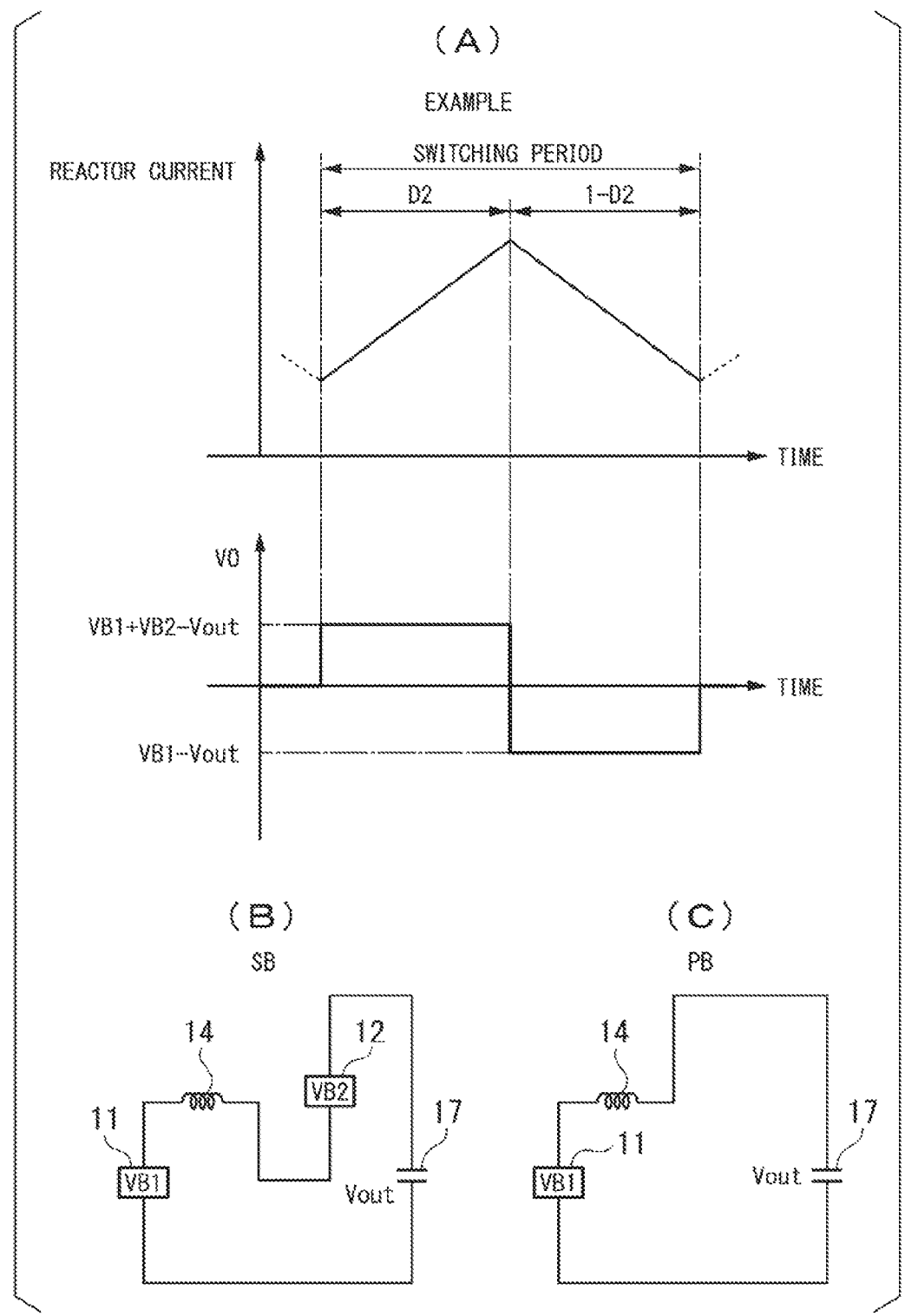
FIG. 15 is an illustration showing a change of the reactor current and the voltage of both ends of the reactor when alternately switching between the series state SB and the parallel state PB in a voltage adjustment control according to the example of the embodiment of the present invention.

On the other hand, when alternately switching between the series state SB and the parallel state PB in the voltage adjustment control according to the example of the embodiment, for example, as shown in FIG. 15 (A) to (C), the total interlinkage magnetic flux (=the voltage V0 of both ends of the reactor 14×time) at a peak current of the reactor 14 becomes a voltage (=VB1+VB2−Vout)×the second ON duty D2.

In addition, in the electric power supply apparatus 1 according to the example and the first modified example of the embodiment of the present invention, a closed state and an open state of the pair of the first switching device SW1 and the third switching device SW3, and the second switching device SW2 are fixed, in the parallel mode and the series mode as operation modes of the electric power supply apparatus 1. Thereby, it is possible to apply a voltage to the inverter 3 and the electric motor 2 that are the electric load and drive them without switching losses.

In addition, in the electric power supply apparatus 1 according to the example of the embodiment of the present invention, the reactor 14 is included between the first electric power supply 11 and one of the first node A and the second node B, and thus at the voltage increasing-decreasing time when the voltage of both ends of the reactor 14 is increased and decreased, only the first electric power supply 11 is made to be charged and to be discharged, and thereby a burden of the charge and discharge operations is assigned only to the first electric power supply 11.

Thereby, it is possible to make the first electric power supply 11 and the second electric power supply 12 as a combination of electric power supplies with different characteristics, and increase flexibility in the apparatus configuration.

In addition, in the electric power supply apparatus 1 according to the first modified example of the embodiment of the present invention, the second reactor 31 is included between the second electric power supply 12 and one of the third node C and the fourth node D, and thus at the voltage increasing-decreasing time when the voltages of both ends of the reactor 14 and the second reactor 31 are increased and decreased, the first electric power supply 11 and the second electric power supply 12 are made equally to be charged and to be discharged, and thereby it is possible to distribute the burden of the charge and discharge operations equally to the first electric power supply 11 and the second electric power supply 12.

Thereby, it is possible to suppress a degradation of the first electric power supply 11 and the second electric power supply 12.

Moreover, in the electric power supply apparatus 1 according to the first modified example of the embodiment of the present invention, the reactor 14 and the second reactor 31 are magnetically coupled, and thereby it is possible to downsize the reactor 14 and the second reactor 31.

(Second Modified Example, Third Modified Example)

Figure 16:
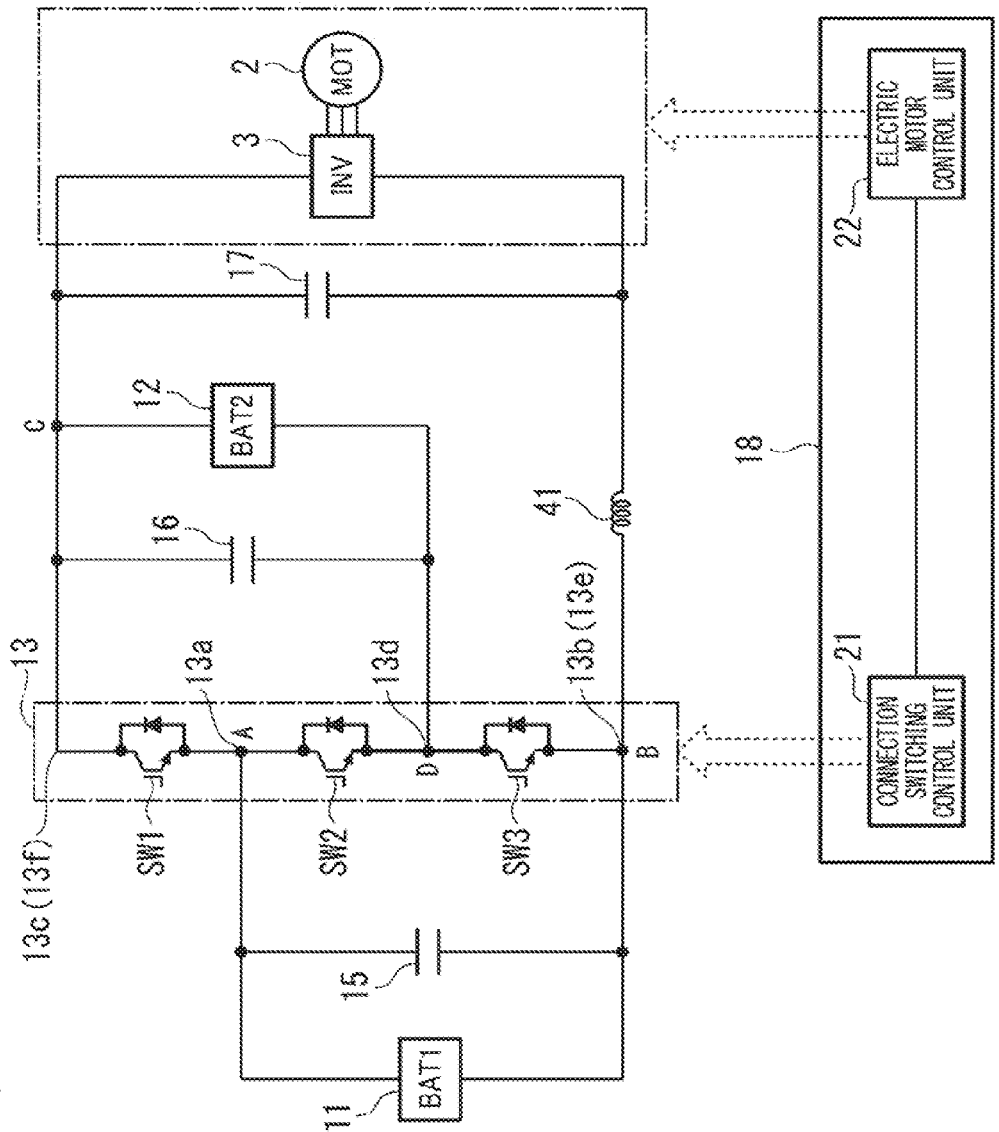
FIG. 16 is a configuration illustration of an electric power supply apparatus according to a second modified example of the embodiment of the present invention.
Figure 17:
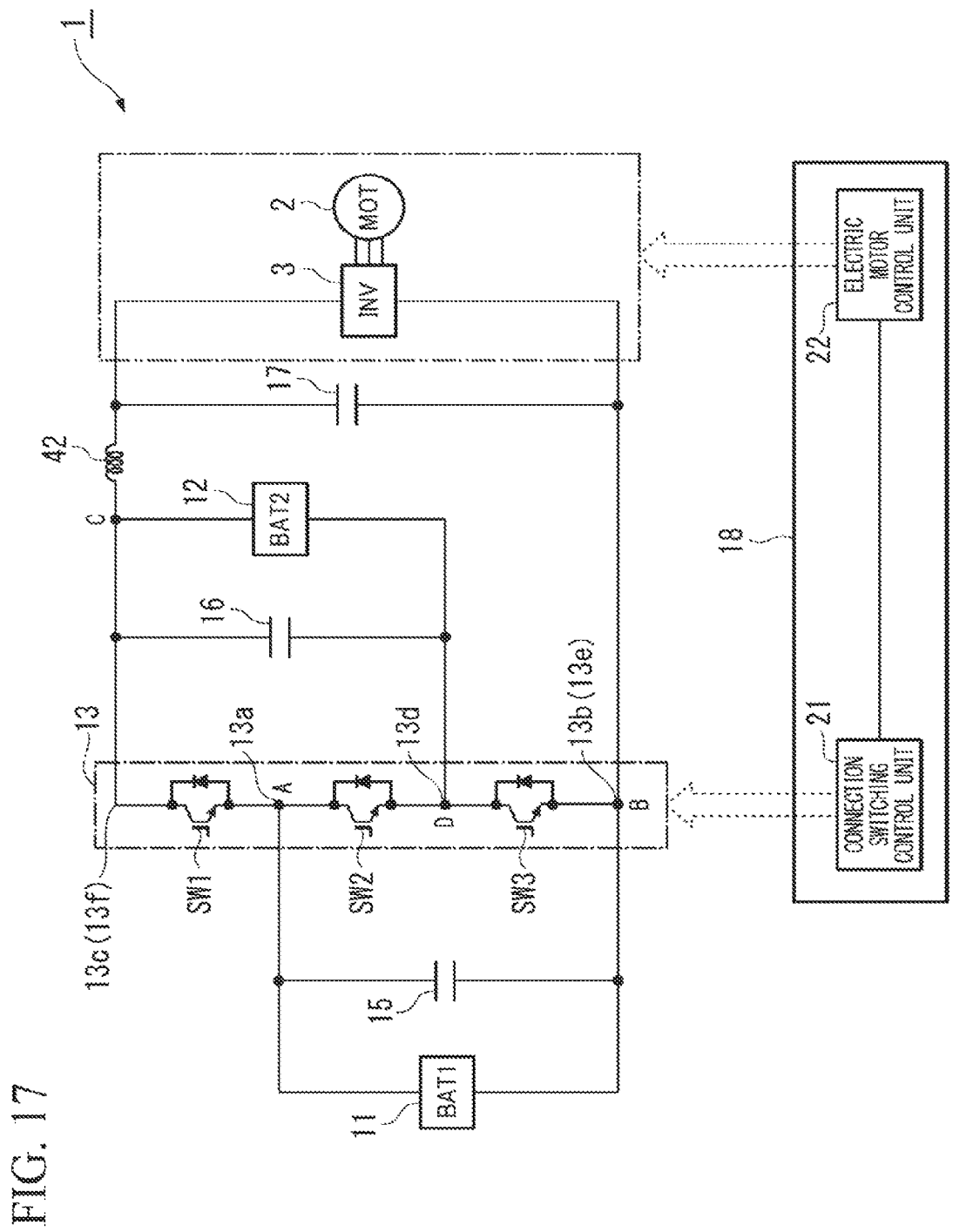
FIG. 17 is a configuration illustration of an electric power supply apparatus according to a third modified example of the embodiment of the present invention.

In addition, in the embodiment described above, for example, in place of the reactor 14, as the electric power supply apparatus 1 according to a second modified example, for instance, shown in FIG. 16, or as the electric power supply apparatus 1 according to a third modified example, thr instance, shown in FIG. 17, a third reactor 41 or a fourth reactor 42 that is provided between the inverter 3 as the electric load and any one of the two output terminals 13*e* and 13*f*, may be included.

According to these second and third modified examples, the single reactor (specifically, the third reactor 41 or the fourth reactor 421) makes it possible to charge and discharge equally the first electric power supply 11 and the second electric power supply 12 equally at the voltage increasing-decreasing time when the voltage of both ends of the reactor is increased and decreased.

Thereby, it is possible to distribute the burden of the charge and discharge operations equally to the first electric power supply 11 and the second electric power supply 12, and it is possible to suppress a degradation of the first electric power supply 11 and the second electric power supply 12.

(Fourth Modified Example)

In addition, in the embodiment described above, the first switching device SW1 and the third switching device SW3 are set to be closed (ON) and the second switching device SW2 is set to be open (OFF) in the parallel mode PA, but the present invention is not limited hereto. For example, in a case where the series mode SA is switched to the parallel mode PA or the like, a constant current control for resolving an unbalance between the voltage VB1 of the first electric power supply 11 and the voltage VB2 of the second electric power supply 12 may be further performed.

An operation of the electric power supply apparatus 1 according to the fourth modified example of this embodiment described above, specifically, a process that alternately switches between the series state SB and the parallel state PB will be described below.

Figure 18:
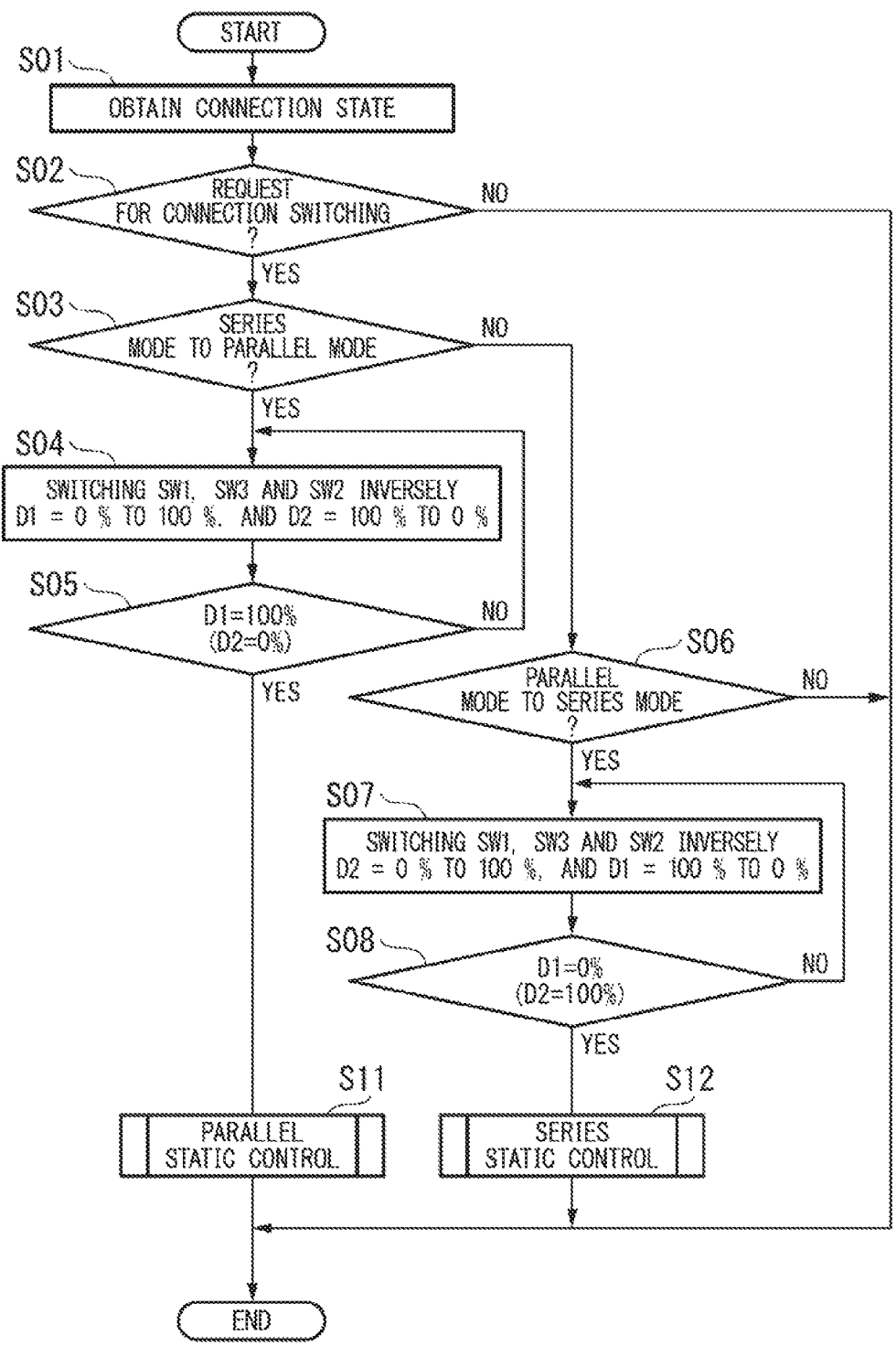
FIG. 18 is a flowchart showing an operation of an electric power supply apparatus according to a fourth modified example of the embodiment of the present invention.

First, for example, in a step S01 shown in FIG. 18, the routine obtains a connection state of the switch circuit 13 corresponding to the operation mode of the electric power supply apparatus 1 (namely, the parallel mode PA or the series mode SA).

Next, in a step S02, the routine determines whether there is a request for switching of the connection state of the switch circuit 13 in accordance with switching of the operation mode of the electric power supply apparatus 1 or not.

In a case that this determination result is "NO", the routine proceeds to END.

On the other hand, in a case that this determination result is "YES", the routine proceeds to a step S03.

Then, in the step S03, the routine determines whether the request for switching of the connection state of the switch circuit 13 is a request for switching from the series mode SA to the parallel mode PA or not.

In a case that this determination result is "NO", the routine proceeds to a step S06 described later.

On the other hand, in a case that this determination result is "YES", the routine proceeds to a step S04.

Then, in the step S04, by alternately switching between the first state in which the pair of the first switching device SW1 and the third switching device SW3 is closed and the second switching device SW2 is open, and the second state in which the pair of the first switching device SW1 and the third switching device SW3 is open and the second switching device SW2 is closed, the first ON duty D1 is gradually changed from 0% to 100%, and the second ON duty D2 is gradually changed from 100% to %0%.

Next, in a step S05, the routine determines whether the first ON duty D1 is 100% and the second ON duty D2 is 0% or not.

In a case that this determination result is "NO", the routine returns to the above step S04.

On the other hand, in a case that this determination result is "YES", the routine proceeds to a step S11. In this step S11, a parallel static control is performed, and the routine proceeds to END.

In addition, in the step S06, the routine determines whether the request for switching of the connection state of the switch circuit 13 is a request for switching from the parallel mode PA to the series mode SA or not.

In a case that this determination result is "NO", the routine proceeds to END.

On the other hand, in a case that this determination result is "YES", the routine proceeds to a step S07.

Then, in the step S07, by alternately switching between the first state in which the pair of the first switching device SW1 and the third switching device SW3 is closed and the second switching device SW2 is open, and the second state in which the pair of the first switching device SW1 and the third switching device SW3 is open and the second switching device SW2 is closed, the first ON duty D1 is gradually changed from 100% to 0%, and the second ON duty D2 is gradually changed from 0% to 100%.

Next, in a step S08, the routine determines whether the first ON duty D1 is 0% and the second ON duty D2 is 100% or not.

In a case that this determination result is "NO", the routine returns to the above step S07.

On the other hand, in a case that this determination result is "YES", the routine proceeds to a step S12. In this step S12, a series static control is performed, and the routine proceeds to END.

The parallel static control in the above step S11 will be described below.

Figure 19:
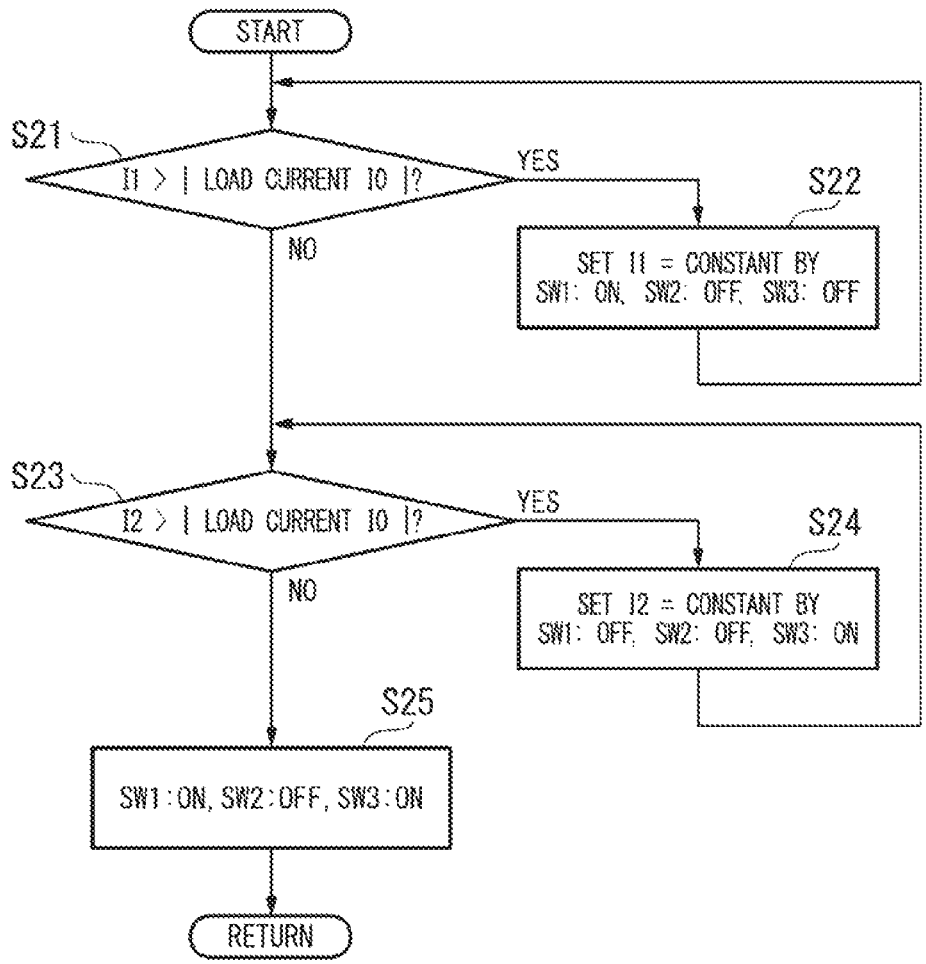
FIG. 19 is a flowchart showing a process of a parallel static control presented in FIG. 18.

First, for example, in a step S21 shown in FIG. 19, the routine determines whether the reactor current I1 is greater than a load current I0 (that is, a current that flows between the positive terminal and the negative terminal of the DC side of the inverter 3) or not.

In a case that this determination result is "NO", the routine proceeds to a step S23 described later.

On the other hand, in a case that this determination result is "YES", the routine proceeds to a step S22.

Then, in the step S22, as an unbalanced state where the voltage VB1 of the first electric power supply 11 is higher than the voltage VB2 of the second electric power supply 12 has been arising, a current flow from the first electric power supply 11 to the second electric power supply 12 is cut off, by setting the first switching device SW1 to be closed (ON), the third switching device SW3 to be open (OFF), and the second switching device SW2 to be open (OFF).

Thereby, the voltage VB of the first electric power supply 11 is decreased by a current consumption at the electric load. Thus, the reactor current I1 and the load current I0 converge to be equal to each other, the voltage VB1 of the first electric power supply 11 and the voltage VB2 of the second electric power supply 12 converge to be equal to each other, and the unbalanced state converges to a state where the first electric power supply 11 and the second electric power supply 12 equally output the load current I0.

Then, in the step S23, the routine determines whether a current I2 (that is, a current I2 that flows from the fourth node D through the second electric power supply 12 to the third node C) is greater than the load current I0 or not.

In a case that this determination result is "NO", the routine proceeds to a step S25 described later.

On the other hand, in a case that this determination result is "YES", the routine proceeds to a step S24.

Then, in the step S24, as an unbalanced state where the voltage VB2 of the second electric power supply 12 is higher than the voltage VB1 of the first electric power supply 11 has been arising, a current flow from the second electric power supply 12 to the first electric power supply 11 is cut off, by setting the first switching device SW1 to be open (OFF), the third switching device SW3 to be closed (ON), and the second switching device SW2 to be open (OFF).

Thereby, the voltage VB2 of the second electric power supply 12 is decreased by a current consumption at the electric load. Thus, the current I2 and the load current I0 converge to be equal to each other, the voltage VB1 of the first electric power supply 11 and the voltage VB2 of the second electric power supply 12 converge to be equal to each other, and the unbalanced state converges to a state where the first electric power supply 11 and the second electric power supply 12 equally output the load current I0.

Then, in the step S25, the first switching device SW1 and the third switching device SW3 is set to be closed (ON) and the second switching device SW2 is set to be open (OFF), and the routine proceeds to RETURN.

The series static control in the above step S12 will be described below.

Figure 20:
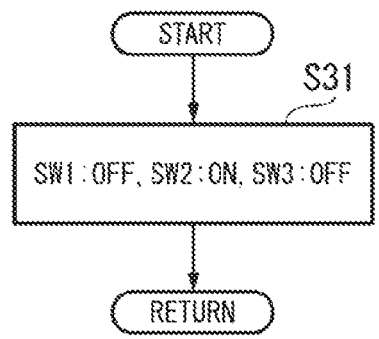
FIG. 20 is a flowchart showing a process of a series static control presented in FIG. 18.

For example, in a step S31 shown in FIG. 20, the first switching device SW1 and the third switching device SW3 are set to be open (OFF), and the second switching device SW2 is set to be closed (ON), and the routine proceeds to RETURN.

According to this fourth modified example, when resolving an unbalance between the voltage VB1 of the first electric power supply 11 and the voltage VB2 of the second electric power supply 12, it is possible to prevent an occurrence of charge and discharge operations between the first electric power supply 11 and the second electric power supply 12 that are irrelevant to electric power distribution to the electric load (that is, an occurrence of a state where a current flows from one of the first electric power supply 11 and the second electric power supply 12 with a higher voltage, to the other with a lower voltage, and thereby the voltages VB1, VB2 of the two converge to be equal).

Thereby, it is possible to perform efficient electric power distribution to the electric motor 2 and the inverter 3 that are the electric load.

In addition, in the embodiment described above, for example, an inverter for a generator that is connected in parallel with the inverter 3, and a generator controlled by this inverter for a generator may be included.

While preferred embodiments of the invention have been described and illustrated above, it should be understood that these are exemplary examples of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An electric power supply apparatus comprising:
   a first electric power supply that is connected between a first node and a second node;
   a second electric power supply that is connected between a third node and a fourth node;
   a switch circuit having at least four input terminals, each of which is connected to the first node, the second node, the third node, and the fourth node, and having at least two output terminals;
   an electric load that is connected between the two output terminals;
   a reactor that is provided at least any one of between the first electric power supply and one of the first node and the second node, and between the second electric power supply and one of the third node and the fourth node;
   a voltage control section that alternately switches between:
   (A) a series state in which a voltage between both ends of the reactor is increased by connecting the first node with the fourth node, connecting the second node with a first output terminal, and connecting the third node with a second output terminal, to form a current loop that connects the first electric power supply, the second electric power supply, and the reactor in series with the electric load, and
   (B) a parallel state in which the voltage between both ends of the reactor is decreased by connecting the first node and the third node with the second output terminal, and connecting the second node and the fourth node with the first output terminal, to connect the first electric power supply and the second electric power supply in parallel with the electric load, and
   that performs, by the alternate switching, a voltage adjustment control which controls a voltage applied to the electric load to fall within a voltage range between a first voltage that is the voltage of the first electric power supply or the voltage of the second electric power supply and a second voltage that is the sum of the voltage of the first electric power supply and the voltage of the second electric power supply; and
   an electric motor as the electric load, wherein
   the voltage control section comprises, as an operation mode, a parallel mode that sets a first switch and a third switch to be closed and a second switch to be open, to connect the first electric power supply and the second electric power supply in parallel with the electric motor.

2. An electric power supply apparatus according to claim 1, wherein the switch circuit comprising
   a first switch that is connected between the first node and the third node, a second switch that is connected between the first node and the fourth node, and a third switch that is connected between the second node and the fourth node, and wherein the voltage control section alternately switches between the series state and the parallel state, by alternately switching between a first state in which a pair of the first switch and the third switch is closed and the second switch is open, and a second state in which a pair of the first switch and the third switch is open and the second switch is closed.

3. An electric power supply apparatus according to claim 1, comprising an electric motor as the electric load, wherein the voltage control section comprises, as an operation mode, a series mode that sets the first switch and the third switch to be open and the second switch to be closed, to connect the first electric power supply and the second electric power supply in series with the electric motor.

4. An electric power supply apparatus according to claim 1, wherein the voltage control section further comprises, as operation modes, a series mode that sets the first switch and the third switch to be open and the second switch to be closed, to connect the first electric power supply and the second electric power supply in series with the electric motor, and performs the voltage adjustment control when switching between the parallel mode and the series mode.

5. An electric power supply apparatus according to claim 1, wherein the reactor is provided between the first electric power supply and one of the first node and the second node.

6. An electric power supply apparatus according to claim 5, comprising, as the reactor, a second reactor that is provided between the second electric power supply and one of the third node and the fourth node.

7. An electric power supply apparatus according to claim 6, wherein a plurality of the reactors are magnetically coupled.

8. An electric power supply apparatus according to claim 1, comprising a reactor that is provided between the electric load and any one of the two output terminals.

9. An electric power supply apparatus according to claim 1, wherein the voltage control section comprises, as operation modes, a first constant current mode that makes the first switch closed, the third switch open, and the second switch open, prior to performing the parallel mode, and a second constant current mode that makes the first switch open, the third switch closed, and the second switch open, prior to performing the parallel mode.

10. An electric power supply apparatus comprising:

a first electric power supply that is connected between a first node and a second node;

a second electric power supply that is connected between a third node and a fourth node;

a switch circuit having at least four input terminals, each of which is connected to the first node, the second node, the third node, and the fourth node, and having at least two output terminals;

an electric load that is connected between the two output terminals;

a reactor that is provided at least any one of between the first electric power supply and one of the first node and the second node, and between the second electric power supply and one of the third node and the fourth node;

a voltage control section that alternately switches between:

(A) a series state in which a voltage between both ends of the reactor is increased by connecting the first node with the fourth node, connecting the second node with a first output terminal, and connecting the third node with a second output terminal, to form a current loop that connects the first electric power supply, the second electric power supply, and the reactor in series with the electric load, and (B) a parallel state in which the voltage between both ends of the reactor is decreased by connecting the first node and the third node with the second output terminal, and connecting the second node and the fourth node with the first output terminal, to connect the first electric power supply and the second electric power supply in parallel with the electric load, and that performs, by the alternate switching, a voltage adjustment control which controls a voltage applied to the electric load to fall within a voltage range between a first voltage that is the voltage of the first electric power supply or the voltage of the second electric power supply and a second voltage that is the sum of the voltage of the first electric power supply and the voltage of the second electric power supply; and an electric motor as the electric load, wherein the voltage control section comprises, as an operation mode, a series mode that sets a first switch and a third switch to be open and a second switch to be closed, to connect the first electric power supply and the second electric power supply in series with the electric motor.

11. An electric power supply apparatus according to claim 10, wherein the voltage control section further comprises, as operation modes, a parallel mode that sets the first switch and the third switch to be closed and the second switch to be open, to connect the first electric power supply and the second electric power supply in parallel with the electric motor, and performs the voltage adjustment control when switching between the parallel mode and the series mode.

12. An electric power supply apparatus according to claim 10, wherein the reactor is provided between the first electric power supply and one of the first node and the second node.

13. An electric power supply apparatus according to claim 12, comprising, as the reactor, a second reactor that is provided between the second electric power supply and one of the third node and the fourth node.

14. An electric power supply apparatus according to claim 13, wherein a plurality of the reactors are magnetically coupled.

15. An electric power supply apparatus according to claim 10, comprising a reactor that is provided between the electric load and any one of the two output terminals.

* * * * *